US012021894B2

(12) United States Patent
Clausen et al.

(10) Patent No.: US 12,021,894 B2
(45) Date of Patent: Jun. 25, 2024

(54) PHISHING DETECTION BASED ON MODELING OF WEB PAGE CONTENT

(71) Applicant: PayPal, Inc., San Jose, CA (US)

(72) Inventors: Todd Clausen, Gilbert, AZ (US); Kevin Tyers, Chandler, AZ (US); Nicholas Bailey, Mesa, AZ (US); Eric Nunes, Scottsdale, AZ (US); Meethil Vijay Yadav, Phoenix, AZ (US); Bradley Wardman, Phoenix, AZ (US); Nathan Pratt, Scottsdale, AZ (US)

( * ) Notice: Subject to any disclaimer, the term of this patent is extended or adjusted under 35 U.S.C. 154(b) by 302 days.

(21) Appl. No.: 16/729,295

(22) Filed: Dec. 27, 2019

(65) Prior Publication Data
US 2021/0203693 A1 Jul. 1, 2021

(51) Int. Cl.
*H04L 9/40* (2022.01)
(52) U.S. Cl.
CPC ...... *H04L 63/1483* (2013.01); *H04L 63/1416* (2013.01); *H04L 63/1425* (2013.01); *H04L 63/1433* (2013.01); *H04L 63/168* (2013.01)
(58) Field of Classification Search
CPC ............. H04L 63/1483; H04L 63/1416; H04L 63/1425; H04L 63/1433; H04L 63/168; H04L 63/1441; H04L 63/166; H04L 63/1408; H04L 63/14
USPC .......................................................... 726/22
See application file for complete search history.

(56) References Cited

U.S. PATENT DOCUMENTS

| | | | |
|---|---|---|---|
| 8,943,588 B1* | 1/2015 | Speegle | .............. H04L 63/1416 726/22 |
| 9,117,076 B2 | 8/2015 | Devost | |
| 9,578,048 B1 | 2/2017 | Hunt et al. | |
| 10,021,133 B1* | 7/2018 | Lakshmanan | ....... H04L 63/1483 |
| 10,104,113 B1* | 10/2018 | Stein | .................... H04L 63/1425 |
| 10,291,639 B1 | 5/2019 | Ali et al. | |
| 11,349,869 B1 | 5/2022 | Moeck et al. | |

(Continued)

OTHER PUBLICATIONS

S. Mondal, D. Maheshwari, N. Pai and A. Biwalkar, "," 2019 International Conference on Advances in Computing, Communication and Control (ICAC3), 2019, pp. 1-6, doi: 10.1109/ICAC347590.2019.9036837.*

(Continued)

*Primary Examiner* — Tae K Kim
(74) *Attorney, Agent, or Firm* — Haynes and Boone, LLP; Eric Li

(57) ABSTRACT

A method for phishing detection based on modeling of web page content is discussed. The method includes accessing suspect web page content of a suspect Uniform Resource Locator (URL). The method includes generating an exemplary model based on an exemplary configuration for an indicated domain associated with the suspect URL, where the exemplary model indicates structure and characteristics of an example web page of the indicated domain. The method includes generating a suspect web page model that indicates structure and characteristics of the suspect web page content. The method includes performing scoring functions for the potential phishing web page content based on the suspect web page model, where some of the scoring functions use the exemplary model to perform analysis to generate respective results. The method includes generating a web page content phishing score based on results from the scoring functions.

20 Claims, 16 Drawing Sheets

(56) References Cited

U.S. PATENT DOCUMENTS

| | | | |
|---|---|---|---|
| 2007/0118528 A1* | 5/2007 | Choi | H04L 63/1483 |
| 2010/0313266 A1* | 12/2010 | Feng | H04L 67/10 |
| | | | 707/E17.014 |
| 2013/0086677 A1* | 4/2013 | Ma | G06F 21/50 |
| | | | 726/22 |
| 2013/0347116 A1 | 12/2013 | Flores et al. | |
| 2014/0007238 A1* | 1/2014 | Magee | G06F 21/577 |
| | | | 726/24 |
| 2014/0033307 A1* | 1/2014 | Schmidtler | H04L 63/1483 |
| | | | 726/22 |
| 2014/0115652 A1 | 4/2014 | Kapoor et al. | |
| 2014/0259157 A1* | 9/2014 | Toma | H04L 51/212 |
| | | | 726/22 |
| 2014/0380482 A1 | 12/2014 | Thomas et al. | |
| 2015/0067853 A1* | 3/2015 | Amrutkar | H04L 63/1466 |
| | | | 726/23 |
| 2015/0220735 A1 | 8/2015 | Paithane et al. | |
| 2016/0119365 A1 | 4/2016 | Barel | |
| 2016/0253679 A1* | 9/2016 | Venkatraman | G06Q 30/0185 |
| | | | 705/310 |
| 2016/0294867 A1* | 10/2016 | Tao | H04L 63/1416 |
| 2016/0352772 A1* | 12/2016 | O'Connor | H04L 63/1483 |
| 2017/0223034 A1 | 8/2017 | Singh et al. | |
| 2017/0223046 A1 | 8/2017 | Singh | |
| 2017/0237753 A1* | 8/2017 | Manning Dawson | |
| | | | H04L 63/1416 |
| | | | 726/23 |
| 2017/0316383 A1* | 11/2017 | Naganathan | G06Q 10/1095 |
| 2018/0124110 A1* | 5/2018 | Hunt | H04L 63/1483 |
| 2018/0294978 A1 | 10/2018 | Camp et al. | |
| 2019/0068638 A1* | 2/2019 | Bartik | H04L 67/02 |
| 2019/0104154 A1* | 4/2019 | Kumar | H04L 63/1483 |
| 2019/0238565 A1 | 8/2019 | Wang et al. | |
| 2019/0311430 A1 | 10/2019 | Raleigh | |
| 2020/0036751 A1* | 1/2020 | Kohavi | H04L 63/1425 |
| 2020/0067861 A1* | 2/2020 | Leddy | G06F 21/6245 |
| 2020/0104488 A1* | 4/2020 | Li | G06F 40/221 |
| 2020/0287913 A1* | 9/2020 | Buck | H04L 63/168 |
| 2020/0314122 A1* | 10/2020 | Jones | H04L 63/1408 |
| 2020/0344251 A1 | 10/2020 | Jeyakumar et al. | |
| 2020/0396258 A1 | 12/2020 | Jeyakumar et al. | |
| 2020/0412747 A1 | 12/2020 | Paine | |
| 2021/0092130 A1* | 3/2021 | Li | G06F 21/563 |
| 2021/0112078 A1 | 4/2021 | Huston, III et al. | |
| 2022/0166770 A1 | 5/2022 | Wright | |
| 2022/0172183 A1 | 6/2022 | Wong et al. | |

OTHER PUBLICATIONS

International Application No. PCT/US2020/065094, International Search Report and Written Opinion dated Mar. 19, 2021, 16 pages.
International Preliminary Report on Patentability for Application No. PCT/US2020/065094 dated Jul. 7, 2022, 9 pages.

* cited by examiner

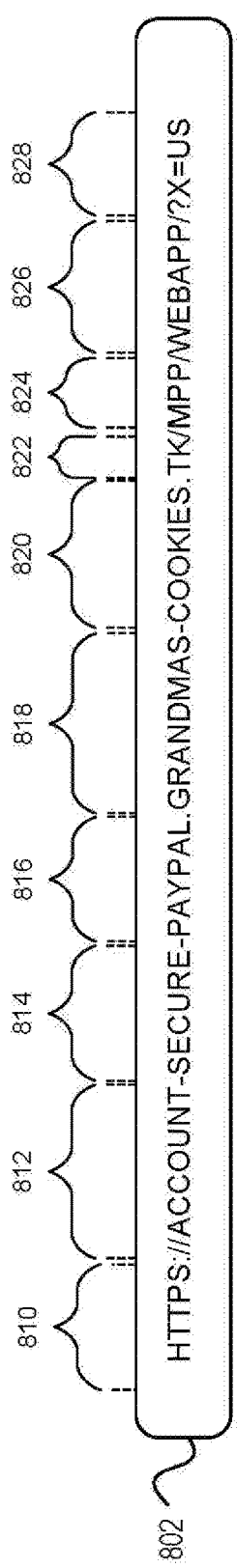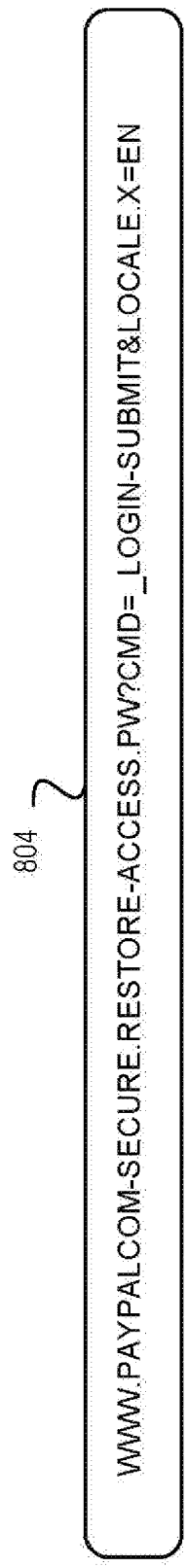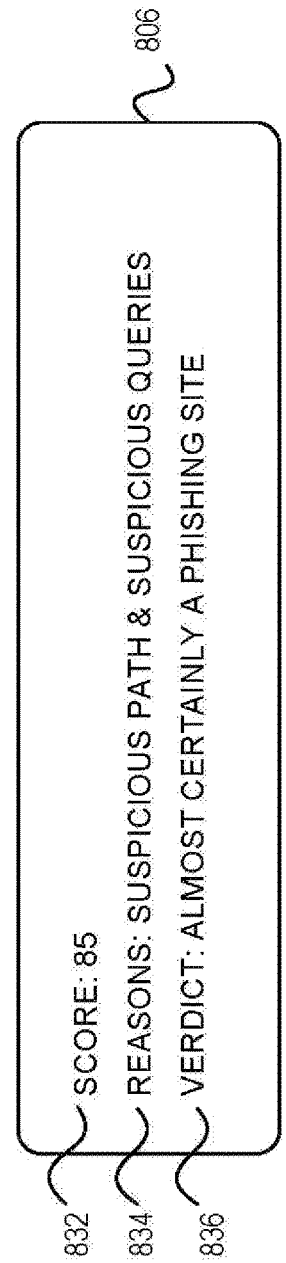
FIG. 8

PHISHING DETECTION BASED ON MODELING OF WEB PAGE CONTENT

BACKGROUND

Embodiments of the present disclosure generally relate to the field of software failure discovery systems and, more particularly, to identification of software issues.

The ubiquitous and perpetual access to Internet information and communication via various channels such as web browsers, email, texts, and various other means has brought both great benefits and potential dangers to its users. Some of the dangers include various forms of malware and/or phishing that are accessible via the same information channels. Unfortunately, the spread and diversity of malware and/or phishing by bad actors has been increasing, making it more difficult to use these information channels without posing security threats to its users. Malware can include various malicious software such as viruses, Trojans, spyware, and/or ransomware. Phishing can include a deceitful use of technology that mimics legitimate communication via these information channels to mislead users to provide sensitive and/or confidential information.

In particular, phishing has become problematic in its success in deceiving users to appear as legitimate websites, links, emails, etc., while in actuality baiting the user to voluntarily provide personal and/or confidential information to the bad actor. A phishing element, such as a phishing URL, can be accessed by the user, and can be provided via email, a webpage link, a text message, and/or via other information channels. As malware and/or phishing attacks get more sophisticated, it is more difficult to identify and prevent and/or mitigate these malware and/or phishing attacks. Although some anti-phishing solutions exist, many have various issues such as providing ad hoc approaches with a lack of a comprehensive set of solutions.

BRIEF DESCRIPTION OF THE DRAWINGS

The present embodiments may be better understood, and numerous objects, features, and advantages made apparent to those skilled in the art by referencing the accompanying drawings.

FIG. 8 is a diagram illustrating example use of the detection engine of FIG. 7 to analyze example URLs.

DESCRIPTION OF EMBODIMENT(S)

Figure 1:
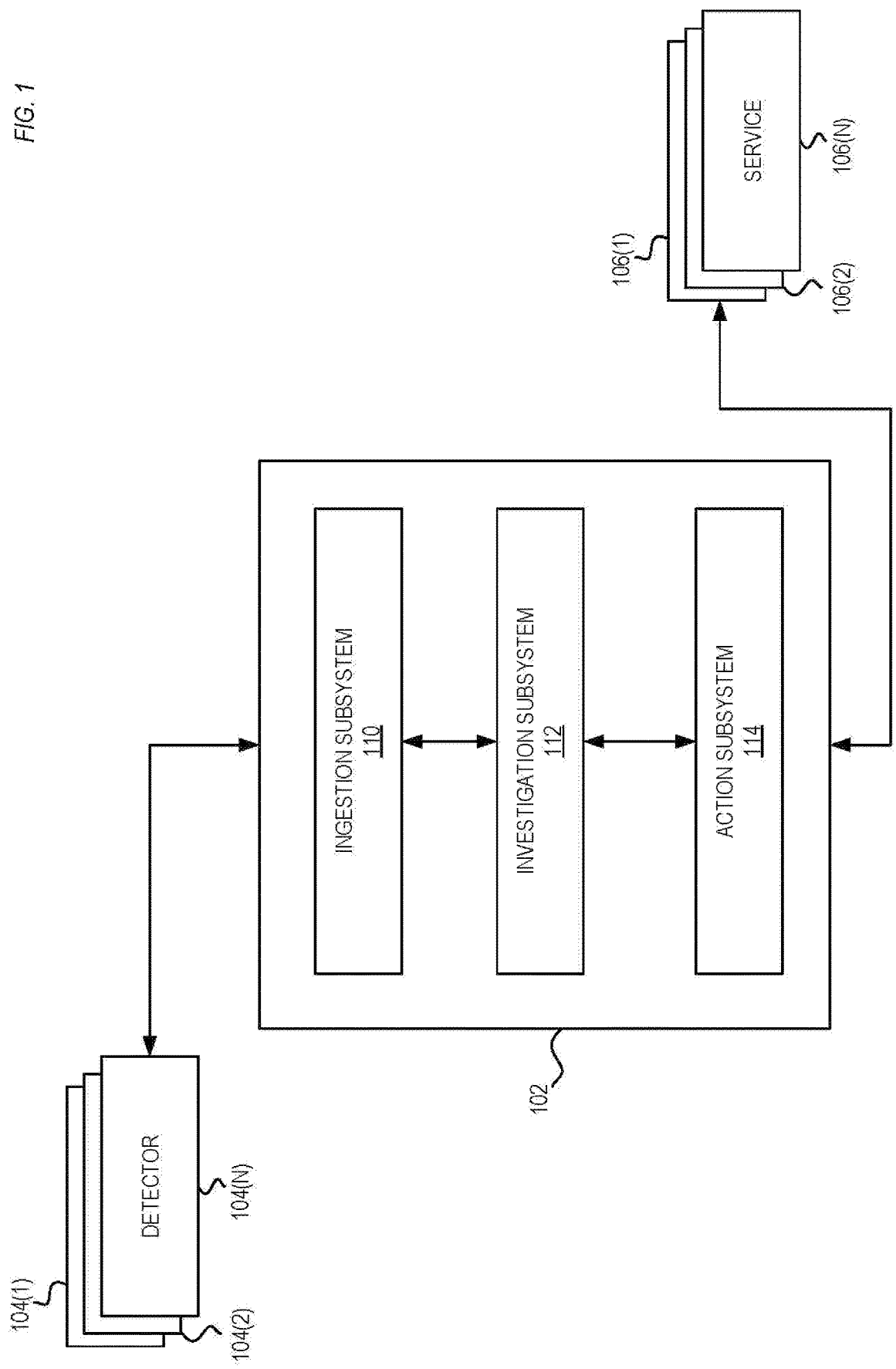
FIG. 1 is a system diagram illustrating embodiments of a malware and phishing detection and mediation (MAPDAM) platform.

The description that follows includes exemplary systems, methods, techniques, instruction sequences, and/or computer program products that embody techniques of the present disclosure. However, it is understood that the described embodiments may be practiced without these specific details. For example, although many of the examples refer to detecting and mitigating phishing, the malware and phishing detection and mediation platform can be used for various malware types that require different mitigation actions. Some other examples discuss implementations such as web pages, Uniform Resource locators (URLs), but this application contemplates use of other references to web resources.

Malware and/or phishing attacks can be instigated via various information channels (commonly used communication and information access means), such as via web browsers, email, texts, telephone calls, among others. The ubiquity, diversity, and sophistication of malware and/or phishing attacks by bad actors has been increasing, making it more difficult for users to use these information channels without exposing themselves to security threats. As used in this application, malware refers to various malicious software such as viruses, Trojans, spyware, and/or ransomware. As used in this application phishing refers to various techniques (e.g., social engineering techniques) used by bad actor attackers to obtain personal and/or confidential information.

For example, phishing operates as identity theft by deceiving users to appear as legitimate websites, links, emails, etc., while in actuality baiting the user to voluntarily provide personal and/or confidential information to the bad actor. Some phishing web pages can be fairly sophisticated and appear legitimate by replicating parts of target site—e.g., either a target site of a certain checkout webpage of a well-known company such as PAYPAL, a sign on page for a social media platform or email provider, or a general design that appears familiar—such as a general design structure including identifiable characteristics such as fonts, colors, arrangement of visual elements of that well-known company. Phishing elements used for phishing can be accessed by the user via any of the communication channels such as via a URL that can be provided via email, a webpage link, or a text message. A phishing website can prompt the user for sensitive information, such as the user's name, social security number, bank account(s), username(s), password(s), and/or other confidential information.

A malware and phishing detection and mediation (MAPDAM) platform can be used to detect, investigate, and/or perform mitigate actions to prevent and/or mitigate various malware attacks and phishing websites. The MAPDAM platform can include several stages including ingestion, detection, and/or action stages, among others. At the ingestion stage, the MAPDAM platform can access (e.g., by receiving) potential malware and/or phishing indicators including indicators of phishing sites, such as URLs, domains, web addresses (e.g., Internet Protocol address version 4 (IPv4)), among others. The potential malware and/or phishing indicators may be accessed from Application Programming Interfaces (APIs), data and/or email files, among others.

At the detection stage, the MAPDAM platform can initiate a dynamically configurable sequence of detection engines that may perform a variety of functions for detecting malware and/or phishing including phishing of the URL and/or associated web content. The detection engines can perform one or more of retrieving data about the potential malware and/or phishing indicator (e.g., a certificate), a hosting provider, autonomous system number (ASN), a history of hosting phishing URLs, and/or content using the phishing indicator(s). The detection engines can utilize engineered rules, machine learning techniques, computer vision, and/or various other techniques to automate detection of malware and/or phishing based on the potential malware indicator(s). Each detection engine may make a separate classification decision including continuing analysis, suspending further processing, or initiating mitigation. At the detection stage, results from the other detection engines can be used to make a final malware and/or phishing determination.

At the action stage and based on results of the detection stage, the MAPDAM platform can select one or more prevention and/or mitigation actions. The MAPDAM platform can communicate with one or more mitigation services, such as the Anti-Phishing Working Group (APWG), safe browsing lists (e.g. Google Safe Browsing or Microsoft Edge), and web hosting provider(s), among others, to initiate the mitigation action(s). At the action stage, the MAPDAM platform can also create communication packets according to an action protocol for reporting detected malware and/or phishing. The action protocol can define evidence portions for the communication packets that, when received by the mitigation services, will enable the mitigation services to take action on the malware and/or phishing without necessarily performing any manual verification steps. The evidence package can be captured during the detection stage of the MAPDAM platform.

In some embodiments, the MAPDAM platform can be used to detect phishing and/or malware using multiple detection engines. The MAPDAM platform can access data from one or more of a monitored portion of website data and a monitored portion of emails. The data can indicate a respective potential malware or a suspect URL (e.g., a potential phishing element). The MAPDAM platform can select one of a plurality of detection engines for processing the data, where the selecting is based on previous results of previous processing by one or more detection engines. Each of the plurality of detection engines can be for performing one or more respective investigation actions on the plurality of data to determine a particular issue with one of the monitored data. The MAPDAM platform can determine a mediation action based on a result of processing of the detection engine and the previous processing.

In some embodiments, the MAPDAM platform can be used to detect phishing and/or malware using uniform resource locators. The MAPDAM platform can access data from one or more of a monitored portion of website data and a monitored portion of emails, where the data indicates a suspect URL. The MAPDAM platform can assign a rule score based on partial rule scores of each portion of the suspect URL, where the rule score can indicate a phishing potential based on URL rules. The MAPDAM platform can determine a uniqueness score of the suspect URL, where the uniqueness score indicates a degree of uniqueness of the suspect URL from a plurality of known phishing URLs. The MAPDAM platform can determine a phishing URL score based, at least in part, on the rules scores and the uniqueness score for the suspect URL.

In some embodiments, the MAPDAM platform can be used to detect phishing and/or malware using website certificates (e.g., SSL certificates) associated with URLs. The MAPDAM platform can access certificate portions of a certificate associated with a suspect URL. The certificate can be accessed at a database that includes certificates obtained by monitoring certificate logs. The MAPDAM platform can access a URL score for the suspect URL. The MAPDAM platform can assign a certificate rule score based on partial certificate scores of certificate portions. The certificate rule score can indicate a phishing potential for the certificate, where each of the partial certificate scores can indicate a likelihood of phishing of each portion based on certificate rules. The MAPDAM platform can use a machine learning model based on the URL score and the certificate to determine a uniqueness certificate value. The MAPDAM platform can determine a phishing certificate value based on the certificate rule score and the uniqueness certificate value for the suspect certificate.

In some embodiments, the MAPDAM platform can be used to detect phishing and/or malware based on modeling of web page content. The MAPDAM platform can access suspect web page content of a suspect URL. The MAPDAM platform can generate an exemplary model based on an exemplary configuration for an indicated domain associated with the suspect URL, where the exemplary model indicates structure and characteristics of an example web page of the indicated domain. The MAPDAM platform can generate a suspect web page model that indicates structure and characteristics of the suspect web page content. The MAPDAM platform can perform scoring functions for the potential phishing web page content based on the suspect web page model, where some of the scoring functions use the exemplary model to perform analysis to generate respective results. The MAPDAM platform can generate a web page content phishing score based on results from the scoring functions.

The following description and associated Figures illustrate various embodiments directed to the ideas listed above.

FIG. 1 is a system diagram illustrating embodiments of a malware and phishing detection and mediation platform coupled with user devices. In FIG. 1, a malware and phishing detection and mediation (MAPDAM) platform 102 can be coupled to one or more detectors 104(1)-104(N) and one or more services 106(1)-106(M). The MAPDAM platform 102 can receive data from each of the detectors 104, where the data can include potential malware and phishing indicators such as potential phishing URLs. The MAPDAM platform 102 can ingest the data, perform various function tests, and select one or more mitigation and/or prevention actions. The one or more mitigation and/or prevention actions can include the MAPDAM platform 102 communicating with the services 106.

The detectors 104 can include various modules that can be external to the MAPDAM platform 102. The detectors 104 can include various modules such as a web browser plug-in, a daemon scrubbing various URLs, an email box monitor application, and/or a web page scraping program, among others. The detectors 104 can provide data to the MAPDAM platform 102, where the data can include a potential malware and/or phishing such as a suspect URL (e.g., a potential phishing element). In some embodiments, the data being provided can be selectively provided to the MAPDAM platform 102 based on certain criterion and/or filtered out by a certain filter. The MAPDAM platform 102 can, for example, request the detectors 104 to provide data that is relevant to certain domains, or based on certain email boxes, among other criteria. In some embodiments, the MAPDAM platform 102 can indicate to a certain one of the detectors 104 how to filter the data based on results of the malware and/or phishing detection of previous data provided by the detectors 104 to the MAPDAM platform 102.

The MAPDAM platform 102 can include an ingestion subsystem 110, an investigation subsystem 112, and an action subsystem 114. The ingestion subsystem 110 can receive the data from the detectors 104. The ingestion subsystem 110 can further filter, transform, and/or group the received data into formats usable by the rest of the MAPDAM platform 102. For example, the ingestion subsystem 110 can normalize the received data that is in a format usable by various detection engines of the investigation subsystem 112. The ingestion subsystem 110 can also queue and/or provide the data to the investigation subsystem 112 at a desired rate. An example implementation of the ingestion subsystem 110 is discussed below with reference to FIG. 2.

The investigation subsystem 112 can apply one or more detection functions on the data. The investigation subsystem 112 can determine which detection functions to perform, such as based on the data, results of a previous detection function, and/or other characteristics such as a type of business performing the detection functions. As discussed below with reference to FIG. 3, each detection engine can perform one or more different detection function(s) and generate respective results indicating whether the data contains malware and/or phishing. Each of the detection functions can generate a separate result that can be used by the investigation subsystem 112 to generate a final malware and phishing score. In some embodiments, the detection functions can be performed sequentially in a pre-determined order. In some embodiments, the detection functions can be performed sequentially in a dynamic order that is determined based on the type of data, result(s) of any previous detection function(s), and/or a type of entity that utilizes the MAPDAM platform 102. In some embodiments, some of the detection functions can be performed in parallel.

In some embodiments, each of the detection functions can also raise an alarm, such as a phishing alarm, which indicates that the data contains malware and/or phishing. Such an alarm can be used to indicate to the action subsystem 114 that malware and/or phishing has been detected, without a need to obtain and/or use results from other detection functions. An example implementation of the investigation subsystem 112 is discussed below with reference to FIG. 3. Example detection engines that implement detection functions of the investigation subsystem 112 are discussed below with reference to FIGS. 6-15.

The action subsystem 114 can receive a final malware and phishing score or a malware and phishing alarm from the investigation subsystem 112. The action subsystem 114 can determine actions, which can be prevention and/or mitigation actions, including communicating with one or more of the services 106(1)-106(N). The services 106 can include an APWG, safe browsing lists, and/or web hosting provider(s). The services 106 can include various mitigation and/or prevention services, which can be provided by third parties that are external to the MAPDAM platform 102.

In some embodiments, the action subsystem 114 can communicate with one or more of the services 106 using an action protocol. The action protocol can define evidence portions for creation of the communication packets that, when received by the mitigation services, will enable the mitigation services to perform action(s) on the malware and/or phishing without necessarily performing any manual verification steps. The action protocol can define characteristics used to retrieve the potential phishing content such as device characteristics, Operating System (OS), browser version & headers, browser user agent, language setting, IP geolocation, ASN, of device(s) from which the data was obtained. Regarding language setting, some phishing content can be accessible only if the language setting in the browser (user agent) was set as expected. For example, a phishing campaign targeted for a German user base would allow traffic only from the German IP space or if the language of the browser is set to German. The evidence package can be created based on the data captured by the ingestion subsystem 110. The evidence package can be created based on the results generated by the investigation subsystem 112. The evidence package can include metadata on the domain registration, hosting IP/network, SSL certificate, etc.

In one embodiment, a payment system (not shown) can use the MAPDAM platform 102. The payment system can be for processing transactions, such as payments and/or order fulfilments. The payment system can perform risk analysis on the services to determine whether or not to perform the service and/or process a payment for the service. The payment system can include payment accounts, each of which can be associated with a buyer or a seller. The payment system can process payments from the user account that is associated with a certain user device. The payment system can provide financial services, such as a fund transfer (e.g., a transfer of a certain monetary amount), to the users of user devices. For example, a buyer (e.g., a user of the certain user device) can be associated with one payment account, and the seller (e.g., a user of another user device) can be associated with another payment account at the payment system. Upon successfully performing the risk analysis on the requested service (e.g., a requested transaction), the payment system can then perform a fund transfer from the buyer's payment account to the seller's payment account. The payment system can be implemented by PAYPAL or another online payment system that allows users to send, accept, and request fund transfers. The MAPDAM platform 102 can access data that is provided from the user devices used in payment system.

Figure 2:
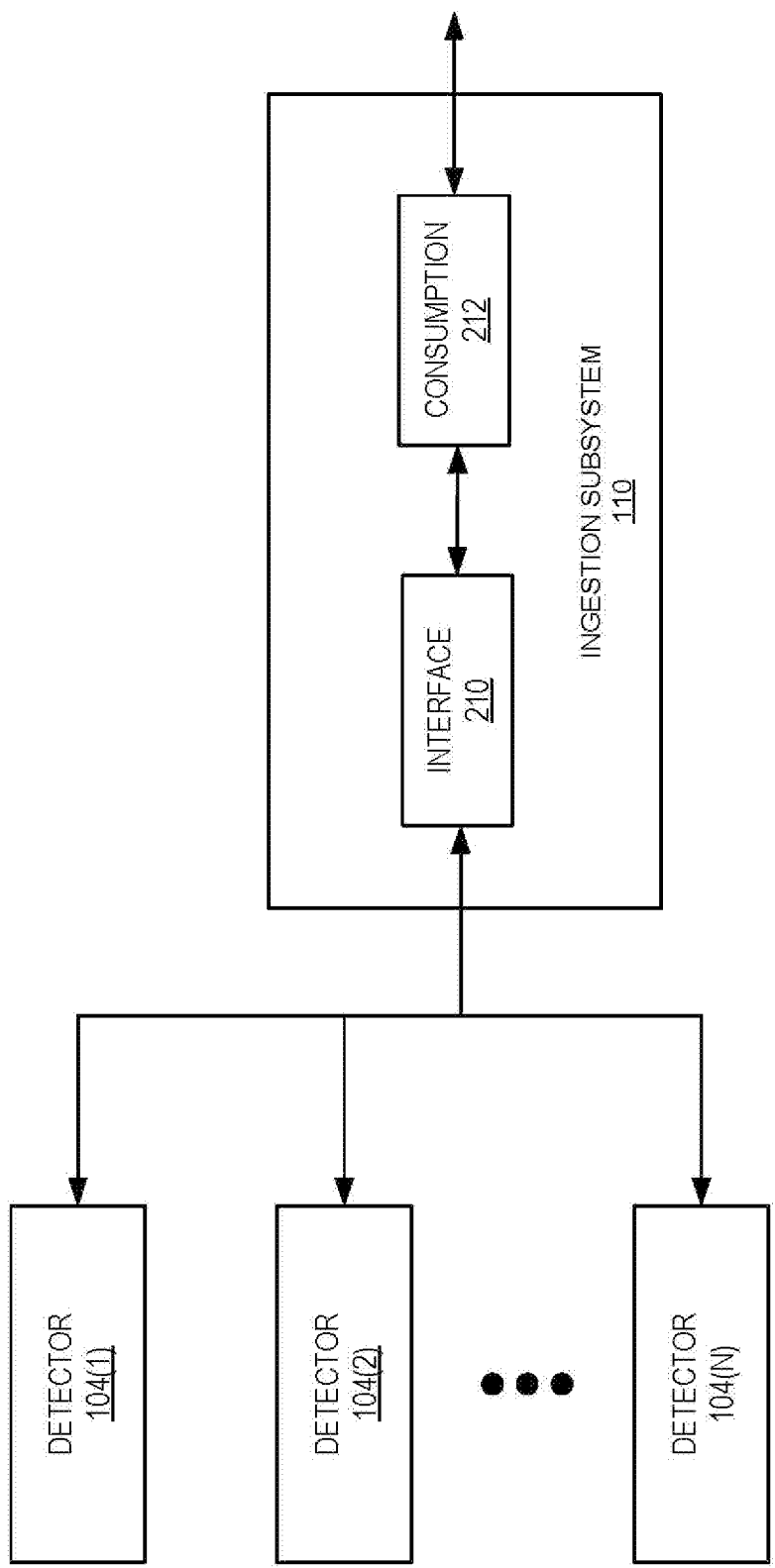
FIG. 2 is a system diagram illustrating embodiments of an ingestion subsystem of the MAPDAM platform communicating with various detectors.

FIG. 2 is a system diagram illustrating embodiments of an ingestion subsystem of the malware and phishing detection and mediation platform communicating with various detectors. FIG. 2 shows the ingestion subsystem 110 that includes an interface 210 and a consumption module 212 coupled with detectors 104(1)-104(N). Each of the detectors 104 can provide data to the ingestion subsystem 110 in real-time, in batches, and/or by writing to some general datastore (which is then accessed by the ingestion subsystem 110).

The ingestion subsystem 110 (at which the ingestion stage takes place) can access potential malware and/or phishing indicators from the detectors 104, such as by receiving data indicating URLs of phishing sites, suspect domains, suspect web addresses (e.g., Internet Protocol address version 4 (IPv4)), among others. The potential malware and/or phishing indicators may be accessed from Application Programming Interfaces (APIs), data and/or email files, among others.

For example, the detector 104(1) can crawl through email boxes, e.g., as a daemon software program running server-side. The detector 104(1) can extract out suspicious attachments, links, URLs, etc., that are then provided to the ingestion subsystem 110. For example, the detector 104(2) can monitor various websites for certain keywords, and submit URLs of any suspicious websites to the ingestion subsystem 110. For example, another one of the detectors 104 can monitor various certificate logs (for certificates associated with websites such as Secure Socket Layer (SSL) certificates) for any new certificates, and submit any suspicious certificates to the ingestion subsystem 110.

In some embodiments, the number and/or type of the detectors 104 can be predetermined for each use, i.e., for each type of business and/or application. For example, a marketplace business using the MAPDAM platform 102 can use a certain configuration with a certain number and type of detectors 104 that are coupled with the ingestion subsystem 110. In the same example, a small local credit union using the MAPDAM platform 102 can use a different configuration that has a different number and type of detectors 104 that are coupled with the ingestion subsystem. In some embodiments, the number and/or type of the detectors 104 can be changed based on results of the analysis performed by the investigation subsystem 112. For example, the investigation subsystem 112 can determine that certain type of data such as URLs and/or links scraped from emails do not provide reliable and/or consistent results. In this case, the ingestion subsystem 110 can re-configure which ones of the detectors 104 are used (such as by adding additional detectors and/or by removing some detectors). Thus, in either of the preconfigured or the dynamic configuration, the MAPDAM platform 102 can provide malware and/or phishing detection and mediation services to multiple entities at the same time, each with a different process flow through various subsystems 110-114 and thus associated with different data.

The ingestion subsystem can include interface 210 and consumption modules 212. The interface module 210 can be an interface layer via which the detectors 104 can provide data to the ingestion subsystem 110. The interface module 210 can be implemented as an API that is accessible by one or more of the detectors 104. The interface module 210 can be implemented as a communication layer that receives data from at least some of the detectors 104. In some embodiments, the interface module 210 can access data that is stored (e.g., in a cloud and/or a database) by some of the detectors 104.

Once the data is received at the interface module 210, the consumption module 212 can filter, transform, and/or group the data into a format usable by the rest of the MAPDAM platform 102 (e.g., by the investigation subsystem 212). For example, the consumption subsystem 212 can normalize the received data into a standard format, which can include separating extraneous data, putting some data in certain fields, and/or removing some non-standard formatting elements, i.e., that is in a format usable by various detection engines of the investigation subsystem 112. The ingestion subsystem 110 can also queue the data such that it is provided to the investigation subsystem 112 at a desired rate.

Figure 3:
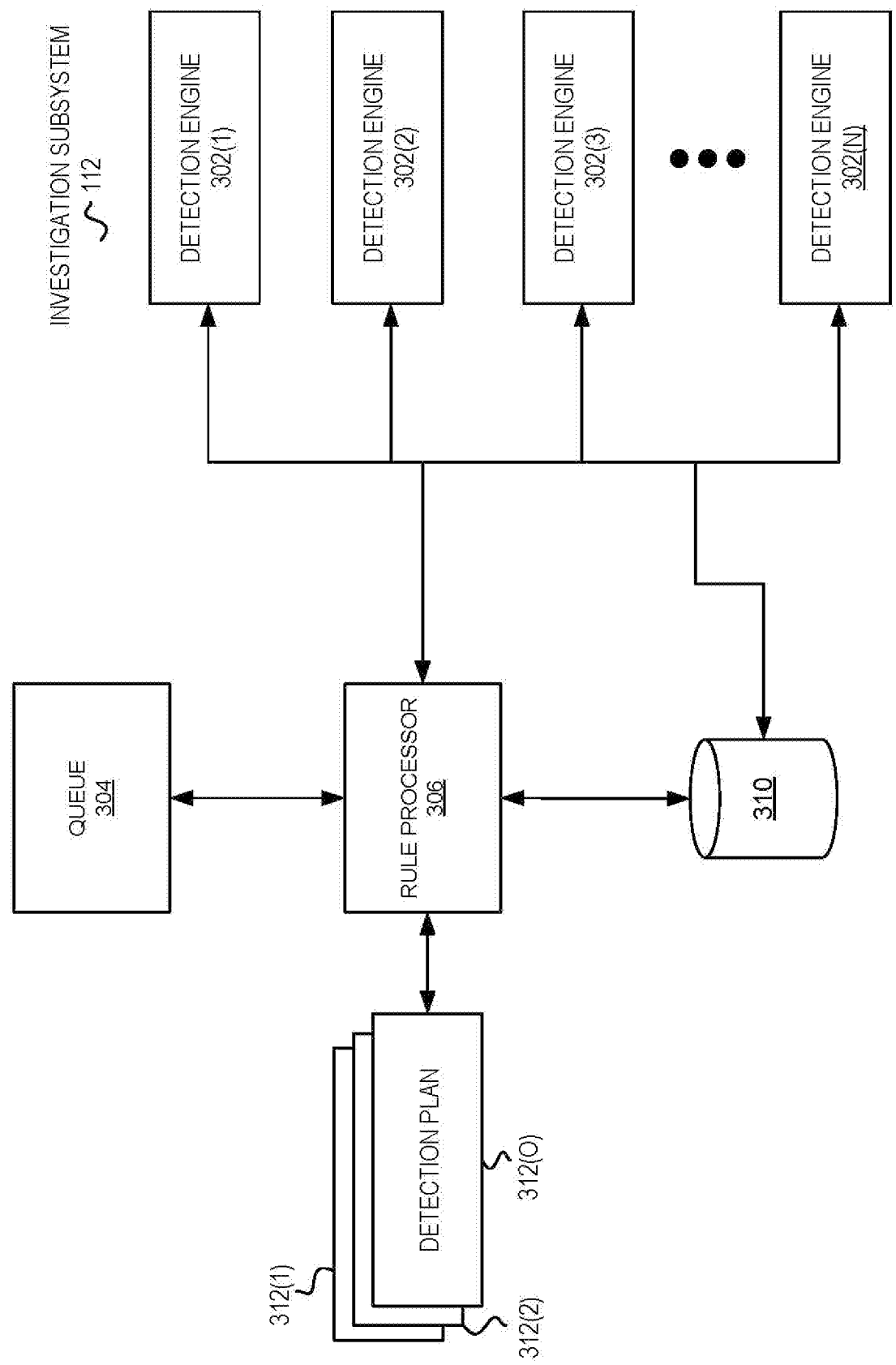
FIG. 3 is a system diagram illustrating embodiments of an investigation subsystem of the MAPDAM platform.

FIG. 3 is a system diagram illustrating embodiments of an investigation subsystem of the malware and phishing detection and mediation platform. The investigation subsystem 112 includes detection engines 302(1), 302(2), 303(3)-302(N) (referred to collectively as 302), a queue 304, a rule processor 306, and storage 310. The investigation subsystem 112 can receive data from the ingestion subsystem 110. The investigation subsystem 112 can use one or more of the detection engines 302 to determine whether the data contains certain malware and/or phishing, and then provide a final result to the action subsystem 114. Upon execution, each of the detection engines 302 can provide a result that includes a malware and/or phishing decision, a score indicating relative strength of the malware and/or phishing decision, and supporting data. The supporting data can depend on the detection engine, and can include data used to create an evidence package (by the action subsystem 114).

The queue 304 can receive data (e.g., the normalized data as received from the consumption module 212) and provide data for other modules of the investigation subsystem 112. The queue 304 can provide data for analysis in various order, such as based on the time each data element was received by the ingestion subsystem 110, the time that an underlying webpage (or another construct such as a corresponding SSL certificate) associated with that data element was created, the time that the underlying element will expire (i.e., in case of certificates which can lose validity after a certain time), and/or other data characteristics. In some embodiments, the data elements of the queue 304 can be modified by the rule processor 306. The queue 304 can include data for various entities, such as one set of data for a marketplace entity and another set of data for a payment system.

The MAPDAM platform 102 can continuously receive data from the detectors 104 for various entities. However, the data received from each of detectors 104 and/or for each entity can be provided at discontinuous and/or different rates. Furthermore, each of the detection engines 302 can process data at different rates. Thus, the queue 304 can receive, store, and/or provide data at different rates for different entities. In some embodiments, the investigation subsystem 112 can process the data in batches (e.g., data available at a certain point in time for a certain entity). In some embodiments, the investigation subsystem can process the data in real-time (e.g., as it is received by the MAPDAM platform 102). It is noted that the discussed use of the queue 304 is exemplary only, and the investigation subsystem 112 can use another technique to store and/or order data for analysis by one or more of the detection engines 302.

The rule processor 306 can operate as an orchestrator that selects which of the detection engines 302 are used for malware and/or phishing detection for particular set of data. The rules processor 306 can use a certain one of detection plans 312(1), 312(2), 312(3), 312(0) (referred to collectively as 312) that can indicate a sequence of detection engines 302 for processing each set of data. The rule processor 306 can determine which of the detection plans 312 to use for each data upon receiving the data from the ingestion module. In some embodiments, each of the detection plans 312 can be associated with a separate entity (e.g., businesses that use the MAPDAM platform 102). For example, the rule processor 306 can use the detection plan 312(1) for all data being analyzed a first entity (e.g., the marketplace of the examples above), and the detection plan 312(2) for a second entity (e.g., the payment system of the examples above). In some embodiments, each of the detection plans 312 can also indicate thresholds and other values used for the detection functions by each of the detection engines 306 in the respective detection plan 312. The rule processor 306 can use the detection plan 312(1), and can include a predetermined sequence of detection engines to use on the first set of data.

The rule processor 306 can modify at least some of the detection plans 312 based on results from the detection engines 312 and depending on permissions associated with that detection plan. For example, the rule processor 306 can modify the detection plan 312(2) for the second entity based on results of processing by the detections engines 302 for a current set of data (e.g., before the MAPDAM platform 102 provides a final result via the action subsystem 114 for a certain set of data). The set of data can be a batch of potential phishing URLs, or just a single potential phishing URL. In another example, the rule processor 306 can modify the detection plan 312(2) for the second entity based on results of processing by the detections engines 302 for a previous set of data (i.e., after the MAPDAM platform 102 provides a final result via the action subsystem 114 for a previous set of data). The rule processor 306 can also receive a malware and phishing alarm, such as a phishing alarm, from one of the detection engines 302. The malware and phishing alarm can indicate that the respective detection engine has determined presence of certain malware and/or phishing. Upon receiving the malware and phishing alarm, the rule processor 306 can determine that further detection functions are not necessary, provide the malware and phishing alarm to the action subsystem 114.

Each of the detection engines 302 can perform one or more different detection functionalities. The different detection functionalities can include one or more of a whitelist determination, blacklist determination, determination of phishing based on URL analysis, determination of phishing based on analysis of certificates associated with URLs, determination of phishing based on content analysis, screenshot analysis, branding issue determination, and sensitive and/or prohibited content determination, among others. Depending on a result from each rule engine, and on whether the detection plan is configurable, the rule processor 306 can perform the next detection function, re-order the detection functions, or indicate to the action subsystem 114 that malware and/or phishing is or is not present.

In some embodiments, the selection of the detection engines 302 can be modified based on previous and/or related data received by the ingestion subsystem 110. The rule processor 306 can determine whether to use any previous analysis on related URLs and IP address data that is related to the currently received data. The rule processor 306 can determine whether to perform new analysis on URL and/or IP address data that is related to the currently received data. For example, the website certificate detection engine 302(2) may not be directly applicable to analyze data that includes a suspect IP address. However, the rule processor 306 may direct the website certificate detection engine 302(2) to analyze the certificates of the domains that were historically hosted on that suspect IP address.

One of the detection engines 302 can be a whitelist detection engine that can check whether suspect data is on a whitelist. If the suspect data is a URL, the whitelist detection engine can check whether the suspect URL is on a trusted URL list, and propagate the result to the rule processor 306. If the suspect URL is not on the whitelist, the rule processor 306 can indicate that result to the rule processor which would then advance processing to the next detection function as indicated in the detection plan. If the suspect URL is included on the whitelist, the rule processor 306 can indicate that result to the rule processor, which could then skip some or all of the remaining detection engines. In some embodiments, matching of the suspect URL with the whitelist can skip a certain subset of the detection engines that are directed to a similar detection function. For example, a whitelisted URL determination can imply skipping of all phishing detection functions, but other detection functions such as branding issue determination, and sensitive and/or prohibited content determination can still be performed. The result from the whitelist detection engine can simply be an indication of whether the URL is on the whitelist.

One of the detection engines 302 can be a blacklist detection engine that can check whether suspect data is on a blacklist. If the suspect data is a URL, the blacklist detection engine can check whether the suspect URL is on a prohibited URL list, and propagate the result to the rule processor 306. If the suspect URL is not on the blacklist, the rule processor 306 can indicate that result to the rule processor which would then advance processing to the next detection function as indicated in the detection plan. If the suspect URL is included on the blacklist, the rule processor 306 can indicate that result to the rule processor could then skip some or all of the remaining detection engines. In some embodiments, the rule processor 306 can determine that a blacklisted URL match will affect the detection plan depending on a type of the blacklist match (as there can be multiple blacklists, such as one for phishing, one for branding issues, etc.). Thus, the rule processor 306 can determine to skip a certain subset of the detection engines depending on a type of a blacklist match. For example, a blacklisted URL determination that is a phished URL can imply skipping of all remaining detection functions; however, a blacklisted URL determination for a branding issue can still be checked for phishing. The result from the blacklist detection engine can simply be an indication of whether the URL is on the blacklist. If the result indicates that the URL is on the blacklist, the result can be a malware and phishing alarm.

Another detection engine can perform URL analysis to determine whether a suspect URL is a phishing URL. The URL phishing detection engine can determine a URL rule score from partial scores of portions of the suspect URL, each of the partial scores indicating a likelihood that the respective URL portion is indicative of the suspect URL being a phishing URL. The URL phishing detection engine can also determine uniqueness of the suspect URL, such as how different a particular URL is from known phishing URLs based on historical phishing URL data. The URL phishing detection engine can determine a URL phishing score based on the URL rule score and the URL uniqueness score. An example implementation of an URL phishing detection engine is discussed below with reference to FIGS. 7-9. The result from the URL phishing detection engine can be a decision indicating whether the URL is a phishing URL, a score (e.g., a confidence indication) of the decision, and supporting data such as indications of problematic URL portions.

Another detection engine can perform analysis of certificates associated with suspect URLs. The website certificate detection engine can evaluate certificates for a subset of suspect URLs received at the ingestion subsystem 110, such as for selected URLs based on certain criteria and/or results from other detection engine(s). The website certificate detection engine can evaluate the suspect certificate based on determining a certificate rule score from partial certificate scores of certificate portions, each of the partial scores indicating a likelihood that the respective certificate portion is indicative of the associated suspect URL being a phishing URL. The website certificate detection engine can determine uniqueness of the suspect URL. The website certificate detection engine can determine a result based on the certificate rule score and the certificate uniqueness. An example implementation of a detection engine for phishing detection based on certificates associated with URLs is discussed below with reference to FIGS. 10-12. The result from the website certificate detection engine can be a decision indicating whether the URL is a phishing URL, a score (e.g., a confidence indication) of the decision, and supporting data such as indications of problematic certificate portions.

Another detection engine can perform phishing detection based on modeling of web page content associated with suspect URLs. The content phishing detection engine can compare a model of a web page for the suspect URL with a model of an exemplary web page of an indicated domain. The models can indicate structure and/or characteristics of the respective web page content. The content phishing detection engine can perform scoring functions for potential phishing web page content based on the web page models. The content phishing detection engine can then generate a web page content phishing score for the suspect URL. An example implementation of a detection engine for phishing detection based on modeling of web page content associated with URLs is discussed below with reference to FIGS. 13-15. The result from the content phishing detection engine can be a decision indicating whether the web page is a phishing web page, a score (e.g., a confidence indication) of the decision, and supporting data such as indications of problematic content portions.

Another detection engine can perform phishing detection based on screenshot of a webpage of the suspect URL. In some cases, the source code of the suspect webpage can be obfuscated to bypass detection mechanisms, using techniques such as a) using special characters (e.g., hex or Unicode); and/or b) using different language characters used as English alphabets (Ñ, Ò, Ä, þ). Even though such techniques are used in the backend source code (e.g., by a web server), the webpage displayed to the user (e.g., on the user device) typically needs to mimic a legitimate web page. In such cases, the screenshot analysis engine can perform optical character recognition (OCR) on the screenshot of the suspect webpage to extract suspect text. The screenshot analysis engine can compare at least portions of the suspect text from OCR-ed webpage with corresponding portions of text of the legitimate webpage. The screenshot analysis engine can compare non-text elements from the suspect webpage with corresponding portions of the legitimate webpage(s).

The screenshot analysis engine can use various legitimate webpages that correspond to typical web pages of the business performing the detection functions. For text elements, the screenshot analysis engine can determine whether certain keywords found in the suspect text like login, username, password, etc. are indicators of a malicious page (e.g., a phishing determination). In some embodiments, the screenshot analysis engine can make the phishing determination in conjunction with some analysis of the content phishing detection engine that can be performed on the suspect text and/or features of the suspect webpage. The screenshot analysis engine can use a machine learning model (MLL) where screenshots of legitimate webpages can be fed to the MLL in order to learn features like color scheme, shape of the buttons, location of the elements on the legitimate webpages. The MLL can then be used to detect similar looking pages that are received by the ingestion module, such as where a high degree of similarity of a suspect webpage can indicate a high likelihood of phishing. The result from the screenshot analysis engine can be a decision indicating whether the web page is a phishing web page, a score (e.g., a confidence indication) of the decision, and supporting data such as indications of malicious portions of the OCR-ed suspect text and/or features of the suspect webpage.

Another detection engine can determine branding issues, such as by determining that the web content linked in by the suspect URL indicates potential trademark issues, such as to trademarks of the indicated domain. The branding detection engine can use image and/or text analysis to determine a likelihood that the web content has a trademark issue. The result from the branding detection engine can be a decision indicating whether the URL indicates a website with a branding issue, a score (e.g., a confidence indication) of the decision, and supporting data such as indications of content portions with potential branding issues.

Another detection engine can determine sensitive and/or prohibited content. The sensitive and/or prohibited content analysis can be performed by image and/or text analysis, such as to a central database and/or repository of sensitive and/or prohibited content, which can be defined by company policies, governmental laws and/or regulations, and other considerations. The sensitive and/or prohibited content can include tragedy and conflict, crime, military conflict, sensational and shocking, profanity, and/or improperly suggestive content. The result from the sensitive and/or prohibited content engine can be a decision indicating whether the URL indicates a website (or linked-in web content) with a sensitive and/or prohibited content issue, a score (e.g., a confidence indication) of the decision, and supporting data such as indications of content portions with potential sensitive and/or prohibited issues.

The storage 310 can be used to store the data elements of the queue 304. In some embodiments, the storage 310 can be used to store results from the detection engine 302. In some embodiments, the storage 310 can be used to store testing data that is used by the detection engines 302. For example, the storage 310 can store rules and/or examples for branding, and sensitive and/or prohibited content for each indicated domain.

Figure 4:
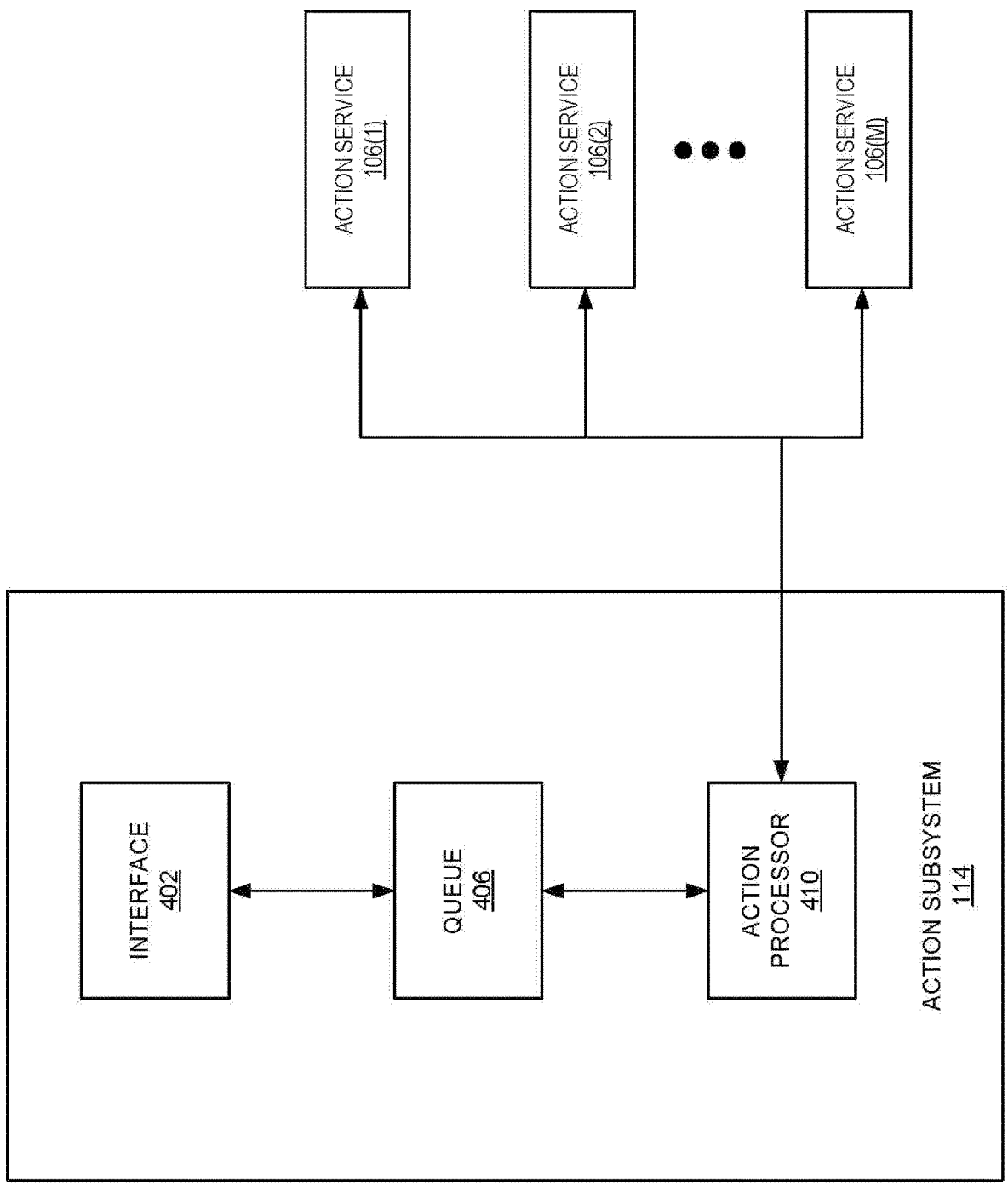
FIG. 4 is a system diagram illustrating embodiments of an action subsystem of the MAPDAM platform.

FIG. 4 is a system diagram illustrating embodiments of an action subsystem of the malware and phishing detection and mediation platform. The action subsystem 114 includes an interface 402, a queue 404, an action processor 408. The action subsystem 114 interfaces with services 106. The action subsystem 114 can receive result data from the investigation subsystem 112. The result data can include one or more results or a malware and phishing alarm from the investigation subsystem 112. Each result can include a malware and phishing decision, a score indicating relative strength of the malware and phishing decision, and supporting data. The supporting data can depend on the detection engine, and can include data the action subsystem 114 use to create an evidence package.

The action subsystem 114 can receive the result data from the investigation subsystem 112. The interface 402 can receive the final results, which can be queued up in the queue 406 (or using another structure). Based on the result data, action processor 410 can determine which of the services 106 to initiate for that data (i.e., for each particular data that is ingested at the ingestion subsystem 110 and processed at the investigation subsystem 112).

The services 106 can include various mitigation and/or prevention services, which can be provided by third parties that are external to the MAPDAM platform 102. The services 106 can include an APWG, safe browsing lists, and/or web hosting provider(s). The action processor 410 can contact a web hosting provider for the phishing URL, and request that the phishing URL be taken down. The action processor can contact several of the services 106 in parallel to maximize effectiveness of any mitigation actions.

In some embodiments, the action subsystem 114 can communicate with one or more of the services 106 using an action protocol. The services 106 can be configured to accept and process communication using such action protocol. The action protocol can define various evidence packages that are relevant to the determined malware and/or phishing type. The evidence package can be created based on the data captured by the ingestion subsystem 110. The evidence package can be created based on the results generated by the investigation subsystem 112. Further discussion of the action protocol and the evidence package are show below with reference to FIG. 5.

Figure 5:
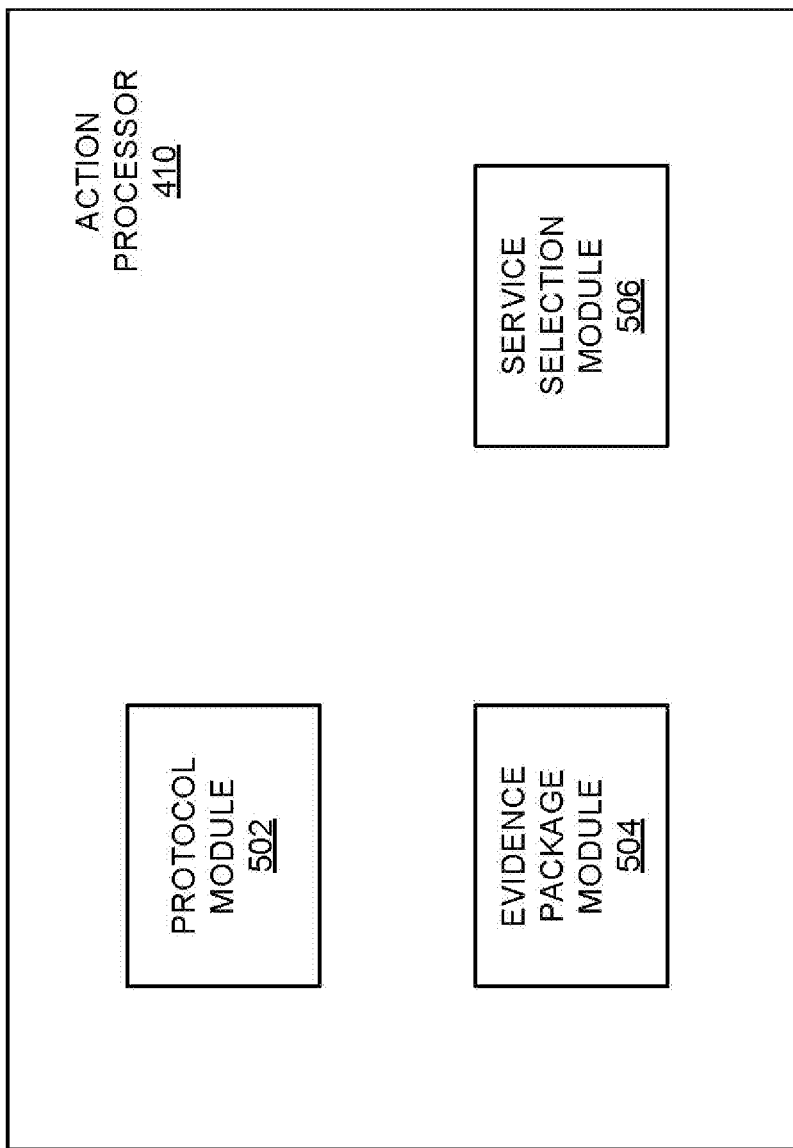
FIG. 5 is a system diagram illustrating embodiments of action processor of an action subsystem of the MAPDAM platform.

FIG. 5 is a system diagram illustrating embodiments of action processor of an action subsystem of the malware and phishing detection and mediation platform. The action processor 410 includes a protocol module 502, an evidence package module 504, and a service selection module 506. The discussion of FIG. 5 is directed to use of an action protocol and/or evidence package. The service selection module 506 operates to determine with which of the services 106 to communicate. The service selection module 506 can select multiple services 106 to communicate with in parallel. The protocol module 502 and/or the evidence package module can determine how to create communication packets for the selected services 106 based on supporting data and results.

The action processor can use the protocol module 502 to generate, based on the results, supporting data, and/or an intended service, communications packets using an action protocol. In some embodiments, the protocol module 502 can implement an action protocol with predefined fields. In some embodiments, the protocol module 502 can implement an action protocol with dynamic fields based on the number and/or type of detection functions that were performed on the particular phishing URL (or malware). For example, for a phishing URL that was found to be on a blacklist, the action protocol can generate and use a shorter communication packet for communicating with the service(s) 106. The shorter action packet can simply include a phishing determination decision, the reason, and malware and/or phishing identifying information. In another example, for a phishing URL that was found to have a final malware and phishing score above a phishing threshold, the action protocol can generate and use a longer communication packet for communicating with the service(s) 106. The longer action packet can include supporting data from each of the detection engines.

The action protocol can define use of action packets that will enable the services 106 to perform action(s) on the malware and/or phishing element without necessarily performing any manual verification steps. The action protocol can define characteristics used to retrieve some supporting data such as device characteristics, Operating System (OS), browser version & headers, IP address-based geolocation, and/or autonomous system number (ASN), of device(s) from which the data was obtained. The evidence package can include metadata on the domain registration, hosting IP/network, SSL certificate, and/or screenshot(s) of the suspect webpage, among others. The action protocol can define evidence portions for creation of the communication packets. The evidence package module 504 can generate an appropriate evidence package for each of the service(s) 106. For example, the evidence package module 504 can generate an evidence package with a first type of supporting data that is relevant to an APWG, and another evidence package with a second type of supporting data that is relevant to a web hosting provider.

Figure 6:
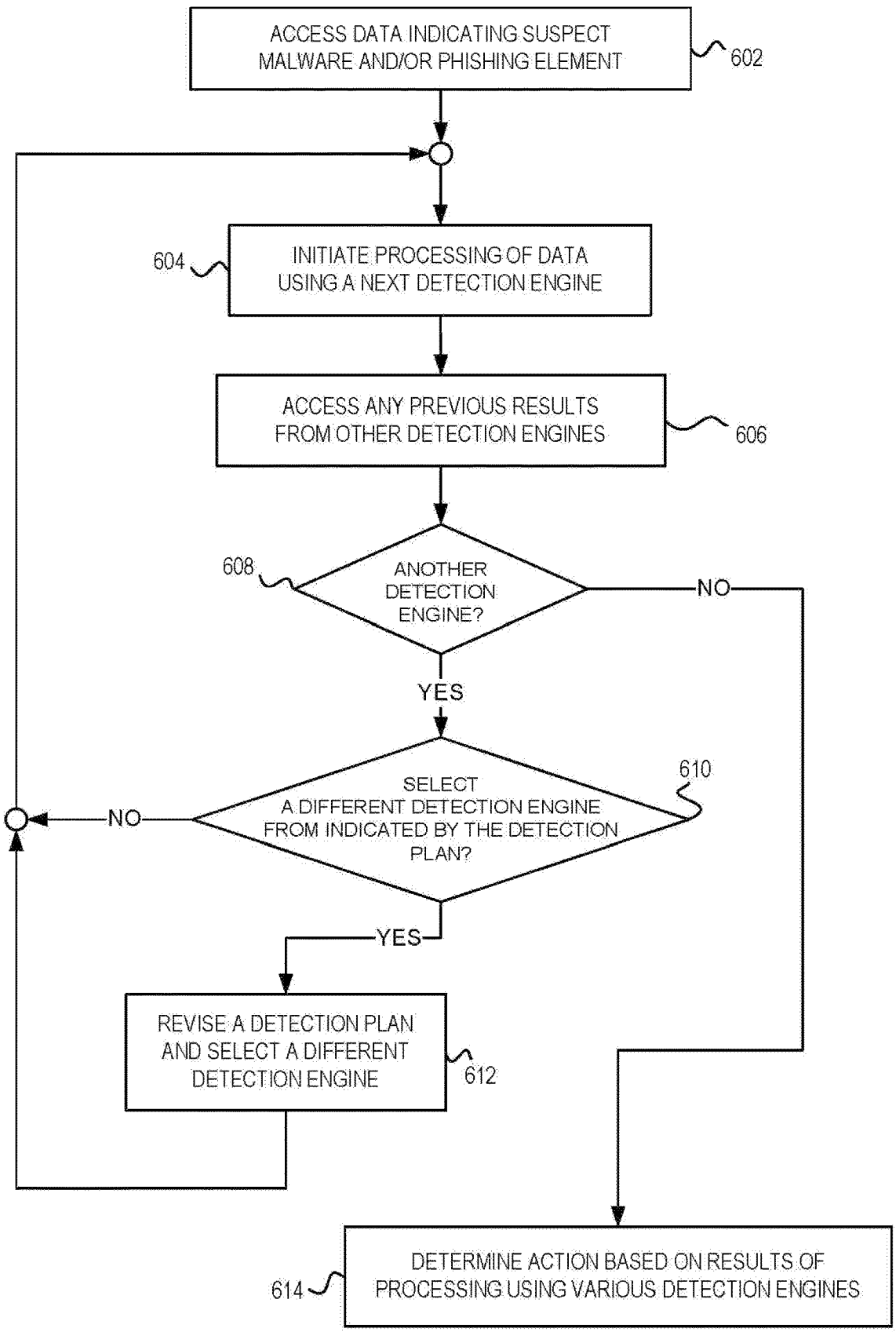
FIG. 6 is a flow chart illustrating embodiments of operations of using the MAPDAM platform.

FIG. 6 is a flow chart illustrating embodiments of operations of using the malware and phishing detection and mediation platform. The method of FIG. 6 is described with reference to the systems and components described in FIGS. 1-5 (for illustration purposes and not as a limitation). The example operations can be carried out by one or more components of the MAPDAM platform 102, such as by different subsystems 110, 112, and/or 114, of the MAPDAM platform 102. In some embodiments, the example operations can be carried out by a central orchestrator (not shown) of the MAPDAM platform 102.

Beginning with 602, the MAPDAM platform 102 accesses data indicating a suspect malware and/or phishing element. The data can be a monitored portion of website data and/or a monitored portion of emails. The phishing element can be a potentially phishing URL. The data can be provided by one or more of the detectors 104, and can be accessed by the ingestion subsystem 110. In some embodiments, the ingestion subsystem can normalize the data, such as by modifying the monitored data into data acceptable for consumption by the plurality of detection engines. The data can include monitored portions of website data such as scraped URLs that may have a certain likelihood of malware and/or phishing. The data can include monitored portions of emails with URLs with a certain likelihood of malware and/or phishing.

At 604, the MAPDAM platform 102 initiates processing of the data using a next detection engine. An initial sequence of detection functions can be indicated by one of the detection plans 312 (e.g., the detection plan 312(1)). The detection plan can be associated with the data being processed (e.g., the data at 602) based on a type of business accessing the MAPDAM platform 102, and/or with a certain type of detectors that provides the data being processed. During processing of the data, the detection engine can determine whether the accessing content of a webpage associated with a URL of the data is required. The detection engine of 604 can, during the processing, analyze one or more of the URL and a cryptographic certificate associated with the URL, without accessing the content.

In some embodiments, a detection plan can include conditional execution. For example, performance of a second detection engine is conditional on a certain result being above a certain threshold. The conditional detection function execution can optimize the speed and/or accuracy of the MAPDAM platform 102. In some embodiments, the next detection engine (i.e., the detection engine of 604 discussed above) can access the previous results of processing the data from detection engines (e.g., a similar process to that discussed below at 606), and determine how to process the data based on the previous results. In some embodiments, the next detection engine can determine that it would not execute, and return a result indicating this non-execution. The next execution engine (such as a website certificate detection engine) can itself determine non-execution if, for example, the detection plan associated with the data being executed does not indicate conditional detection engine execution, yet previous results of data processing are below a threshold determined by the website certificate detection engine.

At 606, the MAPDAM platform 102 can access previous results of processing the data from detection engines. If the MAPDAM platform 102 accesses the investigation subsystem 112 the first time, 604 can be skipped. Otherwise, e.g., when looping from 615, any previous processing results can be accessed (e.g., by the rule processor 306), such as according to a corresponding detection plan 312. Each of the detection engines can be used to determine a certain issue with the data, such as determining whether the data is a phishing URL, whether the data is a type of malware, whether the data indicates a branding issue, and/or whether the data indicates inappropriate content, among others.

At 608, the MAPDAM platform 302 can determine whether to use another detection engine for processing of the data. The rule processor 306 can determine not to use another detection engine when there's a malware and phishing alarm being indicated by a previous detection function (e.g., of 614). The rule processor 306 can determine not to use another detection engine when a combination of the results of the detection engines (including the results obtained at 614) are greater than a certain threshold. The threshold can be associated with the data and/or with a type of business accessing the MAPDAM platform 102. The threshold can be varied based on the detection plan, such as on the number of detection engines scheduled to process the particular data. If the MAPDAM platform 102 determines to use another detection engine, flow continues at 604, otherwise the flow continues at 614.

At 610, the MAPDAM platform 102 determines whether to select a detection engine that is different from that indicated by the detection plan. In some embodiments, a detection plan can include conditional execution. For example, selection of a next detection engine is conditional on certain result(s) (such as whether the result(s) of 604 and/or 606 is/are above a certain threshold). If the MAPDAM platform 102 (e.g., the rule processor 306) determines to select a different detection engine, flow continues at 610, otherwise the flow continues at 614.

At 612, the MAPDAM platform 102 selects a different detection engine. The MAPDAM platform 102 can revise a detection plan associated with the currently processed data. The detection engine can be revised for the particular data being processed, for a respective detector used to obtain the data, and/or for the type of business accessing the MAPDAM platform 102. The rule processor 306 can thus determine to use a different detection engine that is indicated by the detection plan 312(1) associated with the data. For example, the detection plan 312(1) can indicate an initial sequence of detection engine 302(1), 302(2), and 302(3). The rule processor 306 can, based on results from the detection engine 302(1), determine to skip the execution of the detection engine 302(2) and process the data using the detection engine 302(3). Thus, the rule processor 306 can choose a next detection engine from the detection engines 302 based on respective results of previous processing performed by other detection engines. The rule processor 306 can make this determination also based on the type of business accessing the malware and phishing detection and mediation platform.

At 614, the MAPDAM platform 102 determines an action based on results of processing using various detection engines. Specifically, the rule processor 306 can determine preventative/mediation action(s) based on a type of the particular issue being determined at 604, on the result from 604, on any previous results from the other detection engines, and on one or more services 106. The preventative/mediation action(s) can include creation of communication packets according to an action protocol, including a number and type of detection engines used to determine a final malware and phishing score. The communication packets can include an evidence package for submission to one of the action services (e.g., a web traffic monitoring entity).

Phishing Detection Based on URL Analysis

Figure 7:
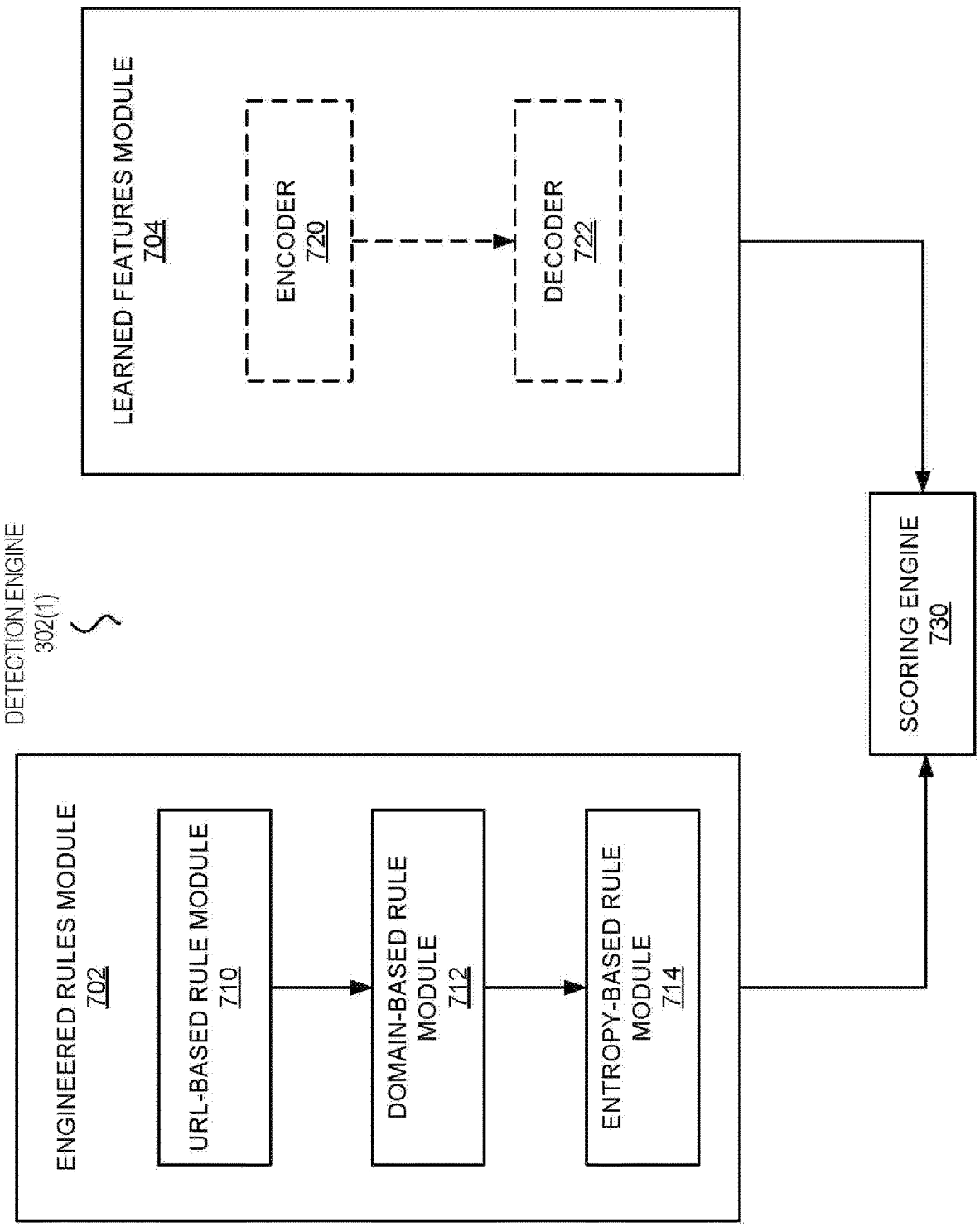
FIG. 7 is a system diagram illustrating embodiments of one of detection engines of the investigation subsystem of the MAPDAM platform to analyze URLs.

FIG. 7 is a system diagram illustrating embodiments of one of detection engines of the investigation subsystem of the malware and phishing detection and mediation platform to analyze URLs. As shown, the detection engine 302(1) is directed to determination of phishing based on URL analysis, i.e., where the data is a suspect URL, or the data includes a suspect URL. Although FIG. 7 shows the detection engine for performing the detection function of determining phishing based on URL analysis (referred to as URL phishing detection engine) as 302(1), there may be additional detection engines used by the rule processor 306 (according to a corresponding detection plan). For example, the rule processor 306 can first initiate processing by a blacklist detection engine and/or a whitelist detection engine prior to accessing the URL phishing detection engine 302(1).

The URL phishing detection engine 302(1) can use an engineered rules module 702 and a learned features module 704, which can separately analyze any URLs to provide individual phishing results for each URL. A scoring engine 730 can combine these individual phishing results to determine a final phishing score for each URL. As discussed below, the engineered rules module 702 can use known features and/or historical data to determine partial scores for each URL, which can then be aggregated. The learned features module 704 can use learned features, such as computed by a machine learning model that can analyze phishing data.

The engineered rules module 702 includes an URL-based rule module 710, a domain-based rule module 712, and an entropy-based rule module 714. Each of these engineered modules 710-714 can determine own partial scores for the same URL, and the partial scores can be aggregated to a single engineered rule score. Examples of how the engineered modules 710-714 can be applied are discussed below with reference to FIG. 8. In some embodiments, the engineered rules module 702 can access entity specific data, where the entity specific data can contain features and instructions on how to score each feature (e.g., URL rules), which can be specific for each entity/business/use case.

The URL-based rule module 710 can assign scores to various portions of the suspect URL. In one implementation, the URL-based rule module 710 can check for various features, and assign partial rule scores based on these features. The entity specific data that includes the features and scoring information can be provided to the URL-based rule module 710 via a cloud, via a local storage, and/or via a portion of a detection plan associated with the suspect URL being analyzed. The features can be obtained from domain specific knowledge of phishing analysis for URL, and can indicate a presence of certain keywords in a domain, hostname, path parameters, path queries, certain top-level domains, and/or other URL features. The URL-based rule module 710 can assign respective partial rule scores (e.g., based on the entity specific data) for each feature analysis, as discussed below with reference to FIG. 8.

In some embodiments, the URL-based rule module 710 can determine a partial score for each feature as weighted by a frequency of occurrence in the historical data. For example, if feature that is a query keyword occurs in majority of phishing sites, the presence of that keyword can get a higher score than less frequent words. The URL-based rule module 710 can generate a partial URL-based rule score based on partial feature scores.

The domain-based rule module 712 can determine a partial domain-based rule score based on length of the domain of the suspect URL. The domain-based rule module 712 can assign a larger partial domain-based rule score for suspect URLs with longer domains. In some embodiments, the domain-based rule score is determined on other aspects of the domain, including historical characterization of that domain.

The entropy-based rule module 714 can determine a partial entropy-based rule score based on randomness of portions of the domain of the suspect URL. The entropy-based rule module 714 can look at a probability distribution of characters in the domain and compare it to a certain threshold. The threshold can be provided by a respective detection plan, selected based on length of the domain, and/or determined based on other characteristics of the suspect URL and/or the business entity that is using the MAPDAM platform 102. If the distribution is too uneven (e.g., above the threshold), the entropy-based rule module 714 can assign a high entropy-based rule score. The entropy-based rule module 714 can assign the entropy-based rule score that is weighted based on relative entropy of the domain.

The learned features module 704 can use learned features that are not based on any domain specific knowledge, but instead can be learned from many phishing URLs collected from online resources and anti-phishing groups. In some embodiments, the learned features module 704 can include an encoder 720 and a decoder 722, such as to implement a sequence-to-sequence model. In some embodiments, the learned features module 704 can be implemented using other machine learning models without the encoder-decoder pair.

For the encoder-decoder pair embodiment, the learned features module 704 can use an encoder 720 and the decoder 722 implemented using multilayered long short-term memory (LSTM) models. The encoder-decoder pair can be used to try to re-create URLs it has seen, which can operate to approximate an identity function. The encoder-decoder pair can be trained on many phishing URLs. During training, the learned features module can also determine a certain error margin between the input URLs and the output URLs of the trained module. Once trained, the encoder 720 can map an input sequence created from the suspect URL to a target vector, which can have a fixed dimensionality.

In some embodiments, the learned features module 704 for the encoder-decoder pair can use one hot encoding or another encoding (e.g., one-cold, binary, gray code, or other encoding technique) for a representation of the suspect URL. For example, the suspect URL can be split into characters, and a URL representation can be generated (e.g., via the one-hot encoding) while maintaining an order of the characters in the suspect URL. This URL representation can be fed in the encoder 720 to generate a vector representation of the input.

The decoder 722 can decode the target vector using the output of the encoder 720. If the trained encoder-decoder pair is given a non-phishing URL as a suspect URL, it is likely to re-create it with a high degree of error because of not seeing it previously (i.e., not being trained on URLs that are similar to the suspect URL). The learned feature model 704 can map this error to a uniqueness score in inverse proportion.

If a non-phishing URL is given to the trained encoder-decoder pair, the learned features module 704 can attempt to recreate the suspect URL with high degree of error because it was not trained on "good" URLs. The learned features module 704 can compute an error between the suspect URL and the recreated URL, and inversely map it to a score. The higher the error, the less the score, the less chance of it being a phishing URL. Thus, the trained encoder-decoder pair can act like an anomaly detector.

In some embodiments where the learned features module 704 is implemented using other machine learning models without the encoder-decoder pair. For example, similarly as above, the learned features module 704 can use an encoder to generate a vector representation of the suspect URL. The learned features module 704 can treat this as a feature vector for a machine learning model such as a Support Vector machine or another one-class classifier. The learned features module 704 can be trained on phishing URLs. Thus, when the learned features module 704 encounters a feature vector of a non-phishing URL, it can mark it as anomalous (with a confidence score). This confidence score can be directly mapped to a uniqueness score to be used to compute the URL phish score.

The scoring engine 730 can determine a URL phish score by combining a score from the engineered rules module 702 and a score from the learned features module 704. The scoring engine 730 can assign a relative weight to each of these scores. These weights can also be updated based on a feedback of reported phishing URLs through active learning. In addition, to the URL phish score, the result can indicate if the submitted URL is phishing or not based on a threshold, as well as any reasons with supporting data for evidence.

FIG. 8 is a diagram illustrating example use of the detection engine of FIG. 7 to analyze example URLs. FIG. 8 shows how suspect URLs 802 and 804 can be analyzed using the URL phishing detection engine 302(1). FIG. 8 also illustrates a result 806 of analyzing the suspect URL 804 by the URL phishing detection engine 302(1). The example of FIG. 8 assumes that a type of business accessing the MAPDAM platform 102 for analyzing the suspect URLs 802 and/or 804 is a business in the payment space, such as PAYPAL.

The engineered rule module 702 of the URL phishing detection engine 302(1) can split the suspect URL 802 into features 810-828. The features 810-828 can include URL domain, hostname, path parameters, path queries, among others. The URL-based rule module 710 can assign a partial score to each of the features on a certain scale that indicates a phishing potential of that feature. For the purpose of this example, the scale can be 0-10, with 0 implying no phishing potential, and 10 implying a high phishing potential.

Using this example, the engineered rule module 702 can assign a partial score of 10 to the "https://" feature, as the "https://" feature is often used by phishers (i.e., the attackers). The engineered rule module 702 can assign a partial score of 5 to each of the "account-" and "secure" 812 and 814, respectively, features as each of these features 812 and 814 has a medium phishing potential. The engineered rule module 702 can assign a partial score of 10 to the "paypal" feature 816 as it has a high phishing potential and is often used by phishers, especially when phishers are targeting potential customers of PAYPAL and/or users in the payment space. The engineered rule module 702 can assign a partial score of 0 to each of the features of "grandmas-" 818 and "cookies" 820, as they each have low phishing potential. The engineered rule module 702 can assign a partial score of 10 to the ".tk" feature 822, as the ".tk" feature 822 is often used by phishers. The engineered rule module 702 can assign a partial score of 5 to each of the features of "mpp/" 824, "webapp" 826, and "/?X=US" 818, as they each have medium phishing potential.

The engineered rule module 702 can then aggregate the partial scores to determine a URL-based rules score for the suspect URL 802. In this example, the URL-based rules score can be 55. In some embodiments, the engineered rule module 702 can normalize the partial rule scores to a common scale, as the domain-based rule module 712 can account for varied lengths of suspect URLs. In this example, the score of 55 may not need any additional normalization. The engineered rule module 702 can then determine, such as by a comparison to a certain threshold, whether the URL-based rule score is a high enough level to trigger a malware and phishing alarm. If the URL-based rule rules score is below the threshold, the suspect URL can be analyzed by the domain-based rule module 712 and the entropy-based rule module 714, as well as by the learned feature module 704.

In another example, the engineered rule module 702 can analyze the suspect URL 804. The suspect URL can be similarly split into multiple features, each of which can be assigned a partial score by the URL-based rule module 710. If the aggregation of partial rule scores is below the threshold, the suspect URL 804 can be similarly analyzed by the modules 712 and 714, as well as by the learned feature module 704. The scoring engine 730 can then determine whether a weighted sum of the scores from the engineered rule module 702 and the learned feature module 704 is above a certain threshold. Based on the determination by the scoring engine 830, the detection engine 302(1) can provide a result 806 for the suspect URL (e.g., the suspect URL 804) that includes the score 832, a reason for the score 834, and a verdict (which can be a confidence level) 836. The detection engine 302(1) can also provide supporting evidence that can be used by the action subsystem 114. The supporting evidence can include any highly suspect URL features, such as the features 810, 816, and 822 (for the suspect URL 802) that scored high; a relatively high entropy score, and/or a low uniqueness score.

Figure 9:
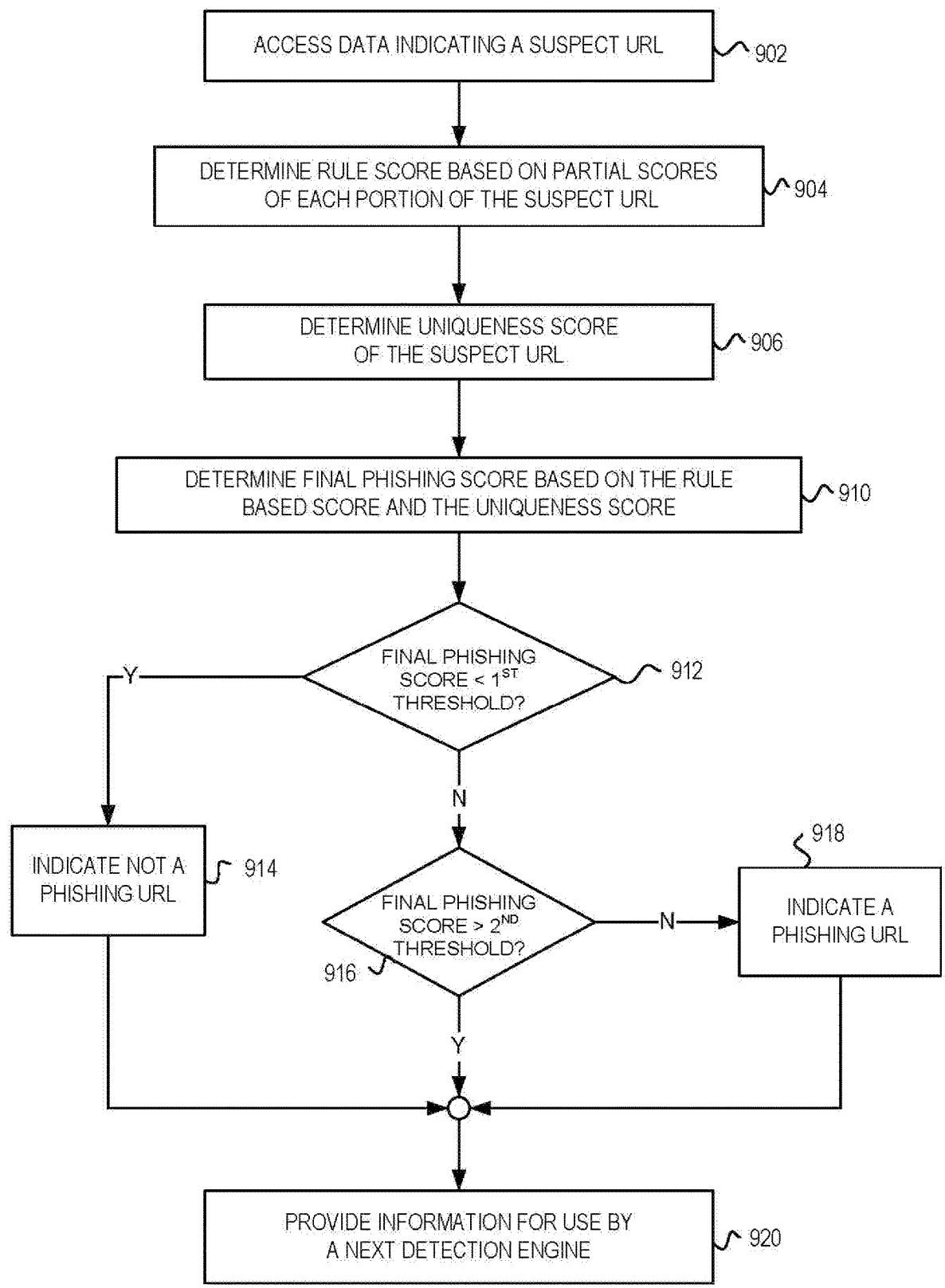
FIG. 9 is a flow chart illustrating embodiments of operations of using the detection engine of FIG. 7 to analyze URLs.

FIG. 9 is a flow chart illustrating embodiments of operations of using the detection engine of FIG. 7 to analyze URLs. The method of FIG. 9 is described with reference to the systems and components described in FIGS. 1-8, and particularly by FIGS. 7 and 8 (for illustration purposes and not as a limitation). The example operations can be carried out by one or more components of the detection engine 302(1) that implements a URL phishing detection engine. For example, the operations of FIG. 9 can be carried out by the engineered rule module 702, the learned feature module 704, and/or by the scoring engine 730. In some embodiments, the example operations can be initiated by a central orchestrator (not shown) of the URL phishing detection engine 302(1), which can be implemented by the scoring engine 730.

Beginning with 902, the URL phishing detection engine 302(1) accesses data indicating a suspect URL. The data can be provided by the ingestion subsystem 110. For example, the accessed data can be the suspect URL 802 or 804. In some embodiments, the URL phishing detection engine 302(1) can access information about potential thresholds, engineered rules to compare against, a specific machine learning model for the learned features model 704, and/or other elements for the URL phishing detection function from a detection plan for the accessed data.

At 904, the URL phishing detection engine 302(1) can determine a URL rule score for the suspect URL. The URL-based rule module 710 can determine partial feature scores for the suspect URL as discussed above with reference to FIGS. 7 and/or 8, which can be aggregated to determine the URL rule score. Similarly, the domain-based rule module 712 and/or the entropy-based rule module 714 can determine respective rule scores. The engineered rule module 702 can determine the URL based rule score based on rule scores of the modules 710-714.

At 906, the URL phishing detection engine 302(1) can determine a uniqueness score of the suspect URL. The learned features module 704 can determine the uniqueness score as discussed above with reference to FIG. 7.

At 910, the URL phishing detection engine 302(1) can determine a URL phishing score based on the rule-based score and on the uniqueness score. The scoring engine 730 can use a certain weight (e.g., as provided by the associated detection plan) to the rule-based score and on the uniqueness score.

At 912, the URL phishing detection engine 302(1) can determine whether the URL phishing score is greater than a first threshold. The first threshold may be provided by the associated detection plan. If the URL phishing detection engine 302(1) determines that the final phishing score is greater than the first threshold, flow continues at 914, otherwise the flow continues at 916.

At 914, the URL phishing detection engine 302(1) can indicate the suspect URL is not a phishing URL. For example, the URL phishing detection engine 302(1) can generate a result with this indication, along with optional evidence information. At 916, the URL phishing detection engine 302(1) can determine whether the final phishing score is greater than a second threshold. The second threshold may be provided by the associated detection plan. If the URL phishing detection engine 302(1) determines that the final phishing score is greater than the second threshold, flow continues at 920, otherwise the flow continues at 918.

At 918, the URL phishing detection engine 302(1) can indicate that the suspect URL is a phishing URL. For example, the URL phishing detection engine 302(1) can generate a result with this indication, along with optional supporting data. At 920, the URL phishing detection engine 302(1) can provide the indication to the next detection engine. For example, the URL phishing detection engine 302(1) can provide the indication of 914, 916, or 918, to the rule processor 306.

Phishing Detection Based on Certificate Analysis

Figure 10:
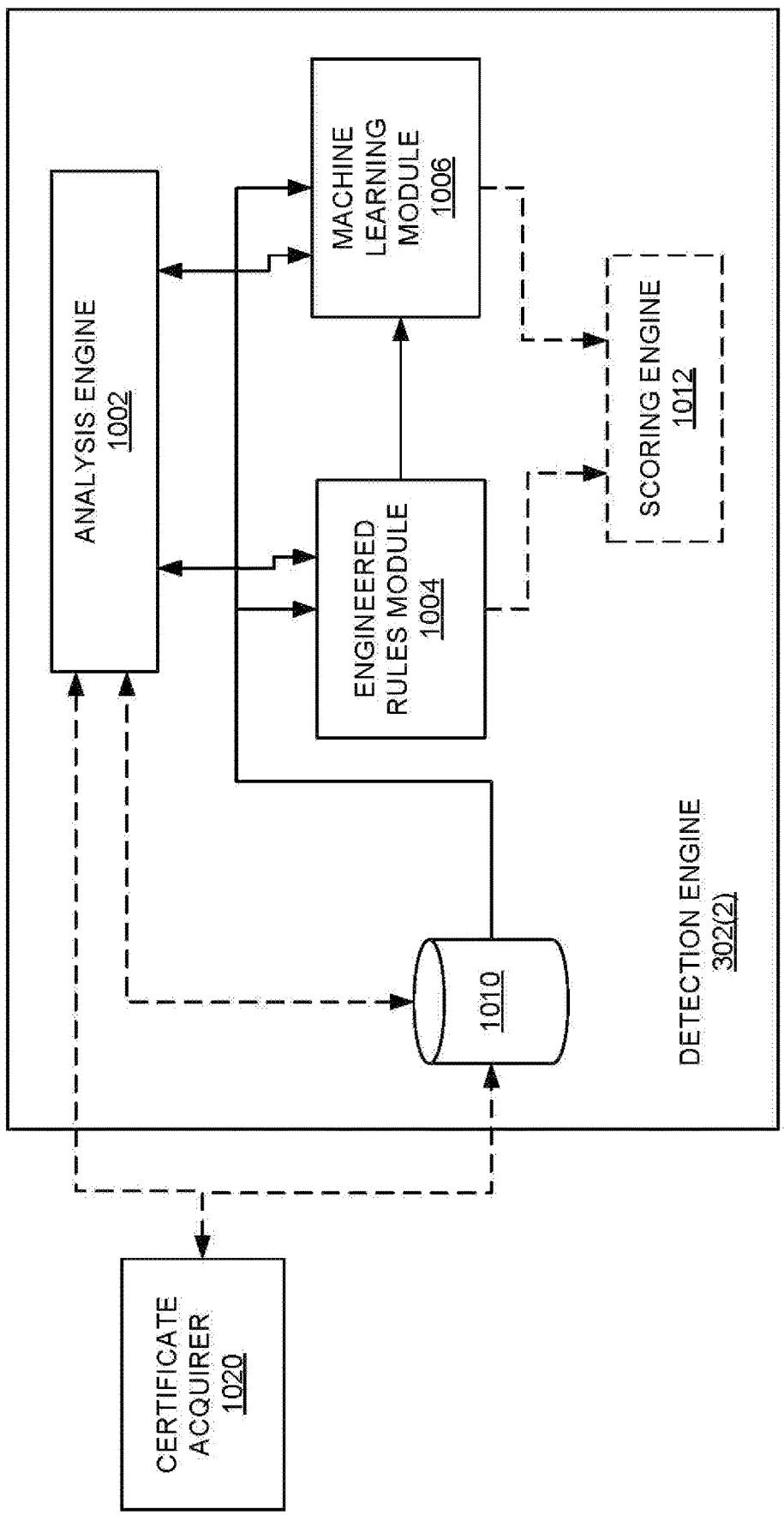
FIG. 10 is a system diagram illustrating embodiments of another detection engine to analyze website certificates associated with a suspect URL.

FIG. 10 is a system diagram illustrating embodiments of another detection engine to analyze website certificates associated with a suspect URL. As shown, the detection engine 302(2) can implement a website certificate detection engine for evaluating certificates of suspect URLs received at the ingestion subsystem 110. In some embodiments, the website certificate detection engine 302(2) can access determinations made by other detection engines, such as the URL phishing detection engine 302(1). In some embodiments, the website certificate detection engine doesn't access a suspect certificate until receiving and/or evaluating results from other detection engine(s).

The website certificate detection engine 302(2) can include an analysis engine, an engineering rules module 1004, a machine learning module 1006, a data store 1010, and optionally a scoring engine 1012. The website certificate detection engine 302(2) can access the certificate acquirer to access a certificate associated with a suspect URL. In some embodiments, the website certificate detection engine 302(2) can access one of the detectors functioning as the certificate acquirer 1020 via the ingestion subsystem 110 to obtain the suspect certificate. In some embodiments, the website certificate detection engine 302(2) can receive a suspect certificate for a suspect URL from the rule processor 306, e.g., as directed by a detection plan associated with the data.

In some embodiments, the rule processor 306 can be notified by one of the detectors (e.g., via the ingestion module 110) that a new certificate has been issued. For example, a certificate log scanning detector can continuously monitor certificate logs for new SSL certificates. The rule processor 306 can then initiate a processing detector (such as the certificate acquirer 1020) to access the new certificate and determine all of the domains and/or URLs indicated by that new certificate. The certificate acquirer 1020 can access, parse, and/or store new certificates, such as discussed below with reference to FIG. 11.

The rule processor 306 can then initiate the determination of phishing based on URL analysis detection function by the URL phishing detection engine 302(1) on most or all of the URLs indicated by the new certificate. The URL phishing detection engine 302(1) can thus indicate which URLs have a high phishing potential. Based on the results from the URL phishing detection engine 302(1), the rule processor 306 can initiate determination of phishing based on certificate analysis detection function by the website certificate detection engine 302(2). Thus, the website certificate detection engine 302(2) can perform SSL certificate analysis only for certificates associated with URLs with high phishing potentials.

However, in some implementations such as where the website certificate detection engine 302(2) is a standalone product that provides results using a software-as-a-service (SaaS) paradigm, the website certificate detection engine 302(2) can access the certificate acquirer directly. In the standalone implementation, the URL phishing detection engine 302(1) and the website certificate detection engine 302(2) can be implemented together to provide phishing analysis on URLs. A combined phishing potential result can then be provided by the detection engine 302(2), e.g., using SaaS approach.

A certificate can be implemented as data (e.g., a data file) that can bind a cryptographic key with a certain website. Some examples of certificates include Secure Socket Layer (SSL), Transport Layer Security (TSL), X.509 certificates, Secure/Multipurpose Internet Mail Extensions (S/MIME), code signing certificates, and/or various other types of public-key infrastructure (PKI) for websites, domains, files, and/or emails, among others. Unfortunately, a presence of a certificate does not indicate that the associated website, domain, file, and/or email is legitimate and/or without malware and/or phishing element(s). Bad actors have determined how to issue certificates for websites, domains, files, and/or emails that contain malware and/or phishing elements. For example, a bad actor can issue and associate a seemingly legitimate looking website certificate (e.g., an SSL certificate) for a phishing URL. In some instances, bad actors generate a Certificate Signing Request (CSR) for the Certificate Authority (CA) in order to get the SSL certificate. The CA can validate the information in the CSR and issues the certificate. Non-profit organizations can issue these certificates at no cost. Also, a green padlock next to the URL in the browser can give a sense of security to the user and he/she is more likely to trust the website. Therefore, HTTPS phishing has been increasing exponentially. The website certificate detection engine 302(2) can thus determine whether such a certificate associated with a suspect URL indicates that the URL is malware or a phishing URL.

The analysis engine 1002 can coordinate website certificate analysis, including whether to perform the certificate analysis for URLs. Depending on the implementation, the analysis engine 1002 can make this determination in conjunction with the rule processor 306. The rule processor 306 can indicate that the performance of the website certificate detection engine 302(2) is conditional depending on the result from detection function results from other detection engine(s). In some embodiments, the analysis engine 1002 can indicate to the rule processor 306 whether the website certificate detection engine 302(2) performs an analysis of the certificate associated with the suspect URL, such as based on the result from detection function results from other detection engine(s). In the standalone implementation, the analysis engine 1002 can simply indicate that the website certificate analysis is not performed based on the URL phishing detection results being below a certain threshold.

The website certificate detection engine 302(2) can use an engineered rules module 1004 and a machine learning module 1006, which can analyze a suspect certificate to provide a certificate phishing score for that URL. As discussed below, the engineered rules module 702 can use known features and/or historical data to determine partial scores based on various features, from which a certificate rule score is generated. The machine learning module 1006 can use learned features, such as computed by a machine learning model that can be trained on certificates associated with phishing URLs. A scoring engine 1012 can combine these individual certificate results to determine a final phishing certificate score for each certificate.

The engineered rules module 1004 can assign partial scores based on various features of the suspect certificate. The certificate features can be provided to the engineered rules module 1004 via a cloud, via the local storage 1010, and/or via a portion of a detection plan associated with the suspect URL corresponding to the certificate being analyzed. The engineered rules module 1004 can assign a partial score to each of the features on a certain scale that indicates a phishing potential of that feature. For the purpose of this example, the scale can be 0-10, with a score of 0 implying no phishing potential, and a score of 10 implying a very high phishing potential. The engineered rule module 1004 can generate a certificate rule score that based on all of the partial scores. In some embodiments, the partial scores can be weighted, such as based on dynamic weighting coefficients that can be reconfigured based on success of phishing indications by the detection engine 302(2) (e.g., as fed back by the action service).

Figure 11:
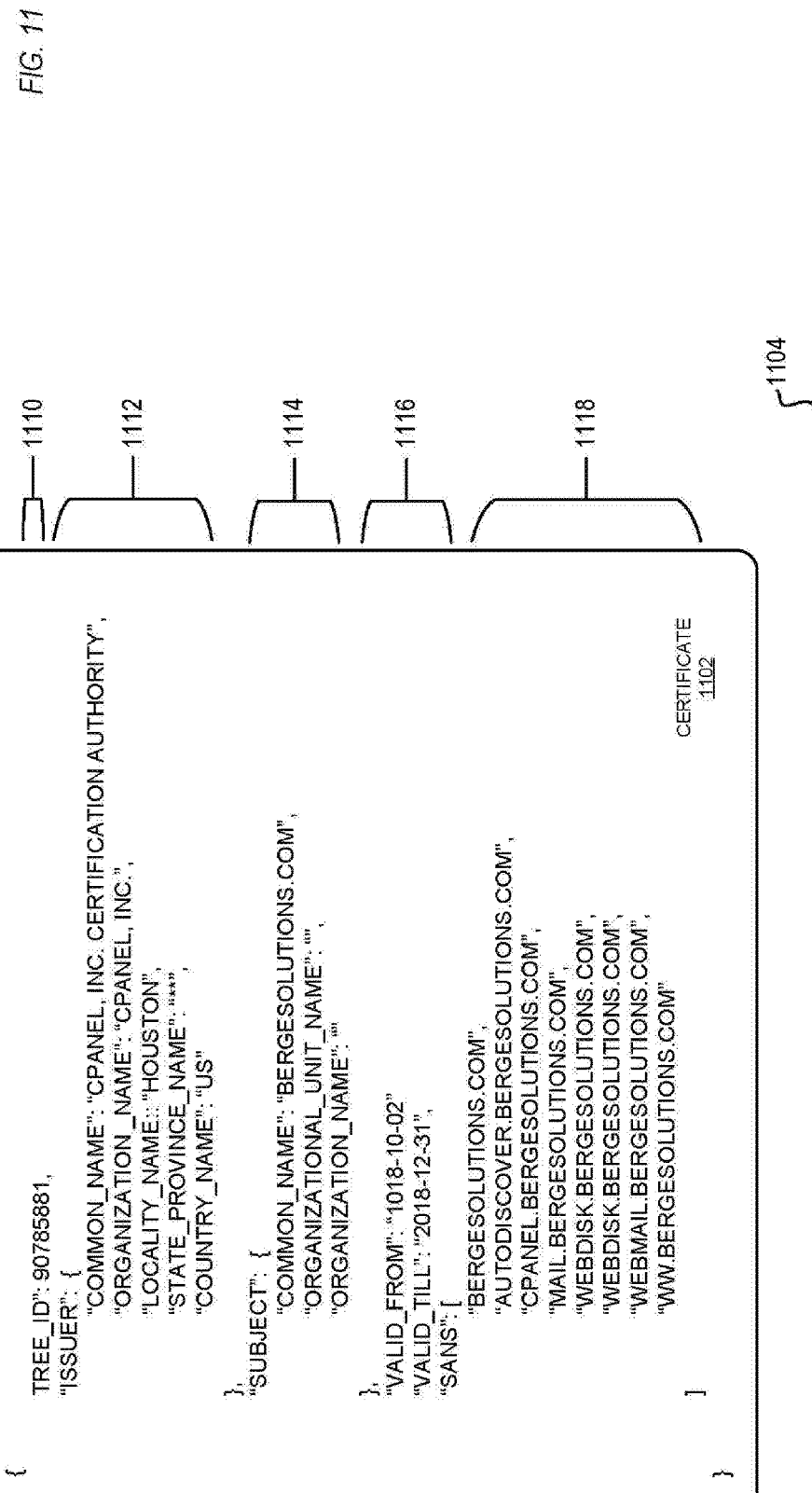
FIG. 11 is a diagram illustrating example use of the detection engine of FIG. 10 to analyze an example website certificate.

An example certificate is shown in FIG. 11, which will be used as an example for the features analyzed by the engineered rules module 1004. One of the features can be a determination of a certificate issuing authority, such as shown at 1112 of FIG. 11. The engineered rules engine 1004 can assign a higher partial score to a certificate issuing authority that has a history of issuing certificates to fraudulent domains/URLs. Another feature can be for determining duration of the certificate, such as shown at 1116 of FIG. 11. The engineered rules engine 1004 can assign a higher partial score to a certificate issuing authority with a shorter duration.

Another feature can be for determining presence of certain characters in the certificate. The engineered rules engine 1004 can assign a higher partial score to a certificate that includes certain characters such as wildcards (such as wildcards "*" shown at the State_Province_Name field of 1112 of FIG. 11). This score can also be dependent on location of the certain characters in the certificate. Another feature can be for detecting a presence of certain keywords in the certificate. The engineered rules engine 1004 can assign a higher partial score to a certificate that includes certain words. This score can also be dependent on location of the certain words in the certificate, such as word "BERGE" in fields 1114 and 1118. Another feature can be an indication of entropy between domains (such as shown at 1118 of FIG. 11) indicated by the certificate. The engineered rules engine 1004 can assign a higher partial score to a certificate with domains that have a higher entropy, i.e., with dissimilar domains. An entropy score can indicate a correlation between registered domains for a certain certificate, such as a degree of dissimilarity between these domains.

Another feature can be related to a revocation or validity status of the certificate. A revoked or expired certificate can be a good indicator of malicious activity. The engineered rules engine 1004 can assign a higher partial score to a certificate that are or have been revoked/expired, and/or have a suspicious validity status. Another feature can be associated with credibility of the Certificate Authority (CA) that issued the certificate. The credibility can be computed, from associated certificate logs, based on a number of certificates issued by the CA to malicious domains. The credibility can be computed, from the associated certificate logs, based on a known or estimated level of verifications done by the CA before issuing each certificate. The engineered rules engine 1004 can assign a higher partial score to a certificate that was issued by a non-credible CA.

The machine learning module 1006 can use learned features that are not based on any domain specific knowledge, but can be learned from many certificates that are found to be associated with phishing URLs. In some embodiments, associated scores from the other detection engine(s) can be used in the training phase, such as to aid any classification. A feature vector can be computed from the certificate features and inputted to the machine learning module 1006. The machine learning module 1006 can be implemented as a 1-class classifier or a Support Vector machine.

In some embodiments, the machine learning module 1006 can be trained on good certificates that are associated with known non-phishing URLs. When the machine learning module 1006 encounters a feature vector for a phishing URL, it can mark it as anomalous with a confidence score. The machine learning module 1006 can use this confidence score by inversely mapping it to a score to be used to compute the uniqueness score. In some embodiments, the machine learning module 1006 can be trained on certificates associated with phishing URLs. Thus, when the machine learning module 1006 encounters a feature vector for a non-phishing URL, it can mark it as anomalous with a confidence score. The machine learning module 1006 can use this confidence score by mapping it to a score to be used to compute the uniqueness score. In some embodiments, the machine learning module can use a score from the other detection engine(s) such as the URL phishing detection engine, as an input. In the standalone implementation, the final score can be set to a combination of the score generated by the URL detection engine and the certificate detection engine.

FIG. 11 is a diagram illustrating example use of the detection engine of FIG. 10 to analyze an example website certificate. FIG. 11 illustrates how the certificate acquirer 1020 can access, parse, and/or store a new certificate 1102. Example fields of the certificate 1102 once it is processed are shown by a parsed certificate 1104. It is noted that the fields of the parsed certificate 1104 are shown for explanatory purposes only, and the certificate acquirer 1020 is operable to process various different types of certificates and/or generate parsed certificates with different fields than what is shown by the parsed certificate 1104.

The certificate acquirer 1020 can thus access and parse fields 1110-1114 of the certificate 1102. In the example certificate 1102, the fields include an ID 1110, issuer info 112, subject info 1114, validity duration 1116, and a list of domains 1118. A record of all the certificates in use can be maintained by the certificate transparency logs, such as http://www.certificate-transparency.org/known-logs. The certificate acquirer 1020 can monitor the logs for any new certificates being added, and collects the raw certificates, decodes and parses the data from it to store in a database such as implemented by storage 1010. This database can be used for certificate lookup based on domains for future applications.

Figure 12:
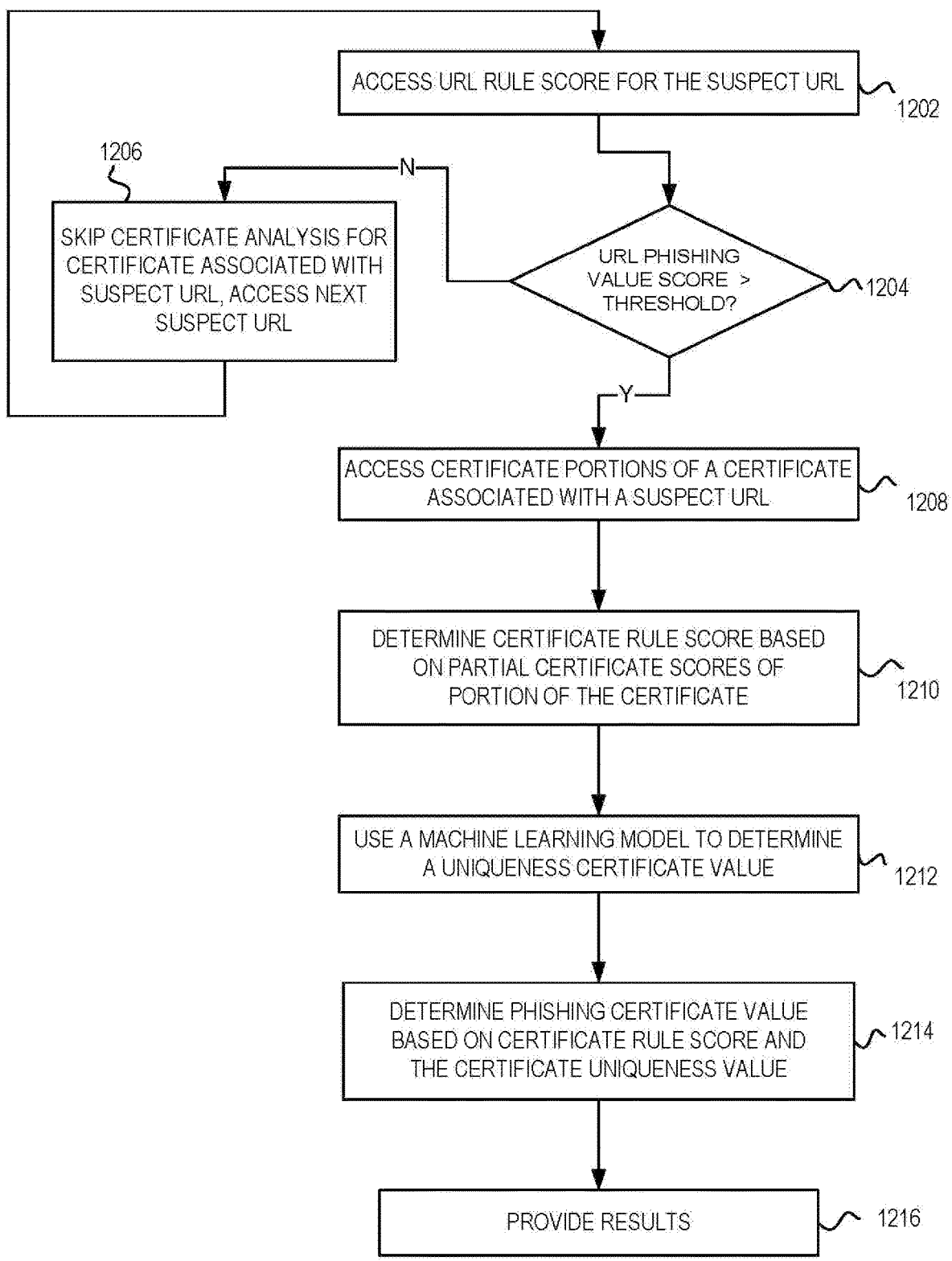
FIG. 12 is a flow chart illustrating embodiments of operations of the detection engine of FIG. 11 for analyzing website certificates.

FIG. 12 is a flow chart illustrating embodiments of operations of the detection engine of FIG. 11 for analyzing website certificates. The method of FIG. 12 is described with reference to the systems and components described in FIGS. 1-6 and 10-11, for illustration purposes and not as a limitation. The example operations can be carried out by one or more components of the detection engine 302(2) that implements a website certificate detection engine. For example, the operations of FIG. 12 can be carried out and/or initiated by the analysis engine 1002, as well as the engineered rule module 704, the machine learning module 704, and/or by the scoring engine 1012.

Beginning with 1202, the website certificate detection engine 302(2) can access URL phishing score for the suspect URL. The URL phishing score can be accessed from the URL phishing detection engine 302(1). As discussed above, the URL phishing score for the suspect URL can be used to determine whether to initiate analysis of the certificate (e.g., of 1202). In some embodiments, the website certificate detection engine 302(2) can access information about potential thresholds, engineered rules to compare against, a specific machine learning model for the machine learning model 1006, and/or other elements for the website certificate phishing detection function from a detection plan for the data associated with the certificate being analyzed.

At 1204, the website certificate detection engine 302(2) can determine whether the URL phishing value is greater than a certain threshold. This threshold can be obtained from an associated detection plan, and/or determined based on the type of a business entity that accesses the website certificate detection engine 302(2). If the website certificate detection engine 302(2) determines that the URL phishing value is greater than the certain threshold, flow continues at 1208. Otherwise, flow continues at 1206. At 1206, the website certificate detection engine 302(2) can skip the certificate analysis detection function for a certificate associated with the suspect URL (e.g., the URL of 1202). Flow can then continue back at 1202.

At 1208, the website certificate detection engine 302(2) accesses certificate portions of a certificate associated with a suspect URL. The data can be provided by the ingestion subsystem 110. In some implementations, the data can be provided by the certificate acquirer 1020. In some embodiments, the certificate can be parsed by the certificate acquirer 1020 and the parsed features (such as discussed above with reference to FIG. 11) can be provided to the website certificate detection engine 302(2), such as to the analysis engine 1002.

At 1210, the website certificate detection engine 302(2) can determine a certificate rule score based on partial certificate scores of the portions of the certificate. The feature engineering engine 1004 can analyze various features of the certificate, as discussed above.

At 1212, the URL phishing detection engine 302(1) can determine a uniqueness score of the suspect certificate. The machine learning model 1006 can determine the uniqueness score as discussed above.

At 1214, the website certificate detection engine 302(2) can determine a phishing certificate score based on the certificate rule-based score and on the certificate uniqueness score. In some embodiments, the scoring engine 1012 can use a certain weight (e.g., as provided by the associated detection plan) to the rule-based score and on the uniqueness score. In some embodiments and as shown by FIG. 10, the machine learning module can use the certificate rule score as one of the inputs and determine the phishing certificate value based on the certificate rule score in addition to the certificate itself.

At 1216, the website certificate detection engine 302(2) can provide results. In some embodiments, the results can be provided back to the rule processor 306. In the standalone implementation, the results can be provided to the requesting third party entity. In either implementation, the website certificate detection engine 302(2) can provide a reason sentence that indicates one or more reasons for the result and optional support data. The reason sentence can be used by the recipient (e.g., the action processor or the requesting third party entity) such as to generate an evidence package.

Phishing Detection Based on Analysis of Web Page Content

Figure 13:
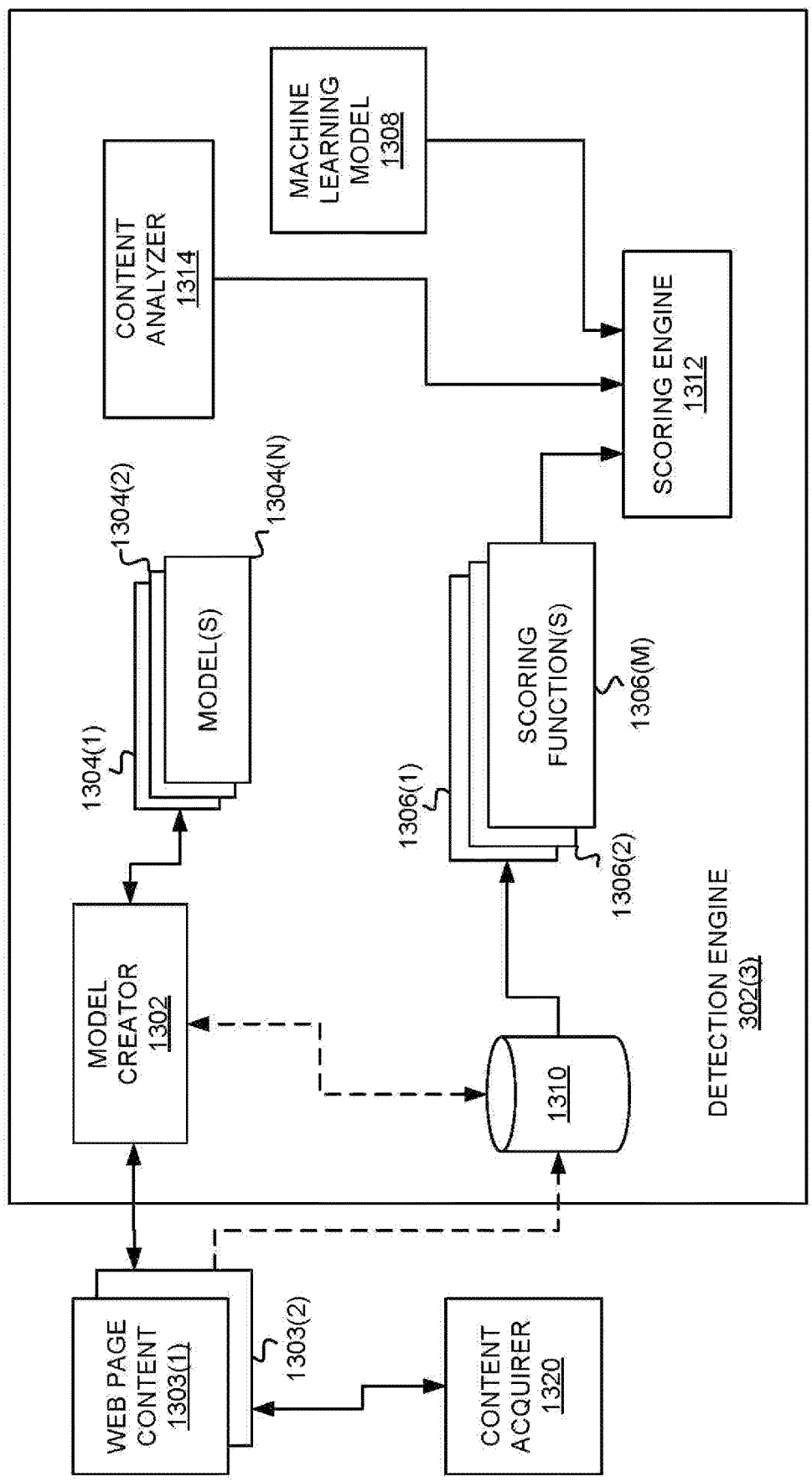
FIG. 13 is a system diagram illustrating embodiments of another detection engine of the investigation subsystem for analyzing content associated with suspect URLs.
Figure 14:
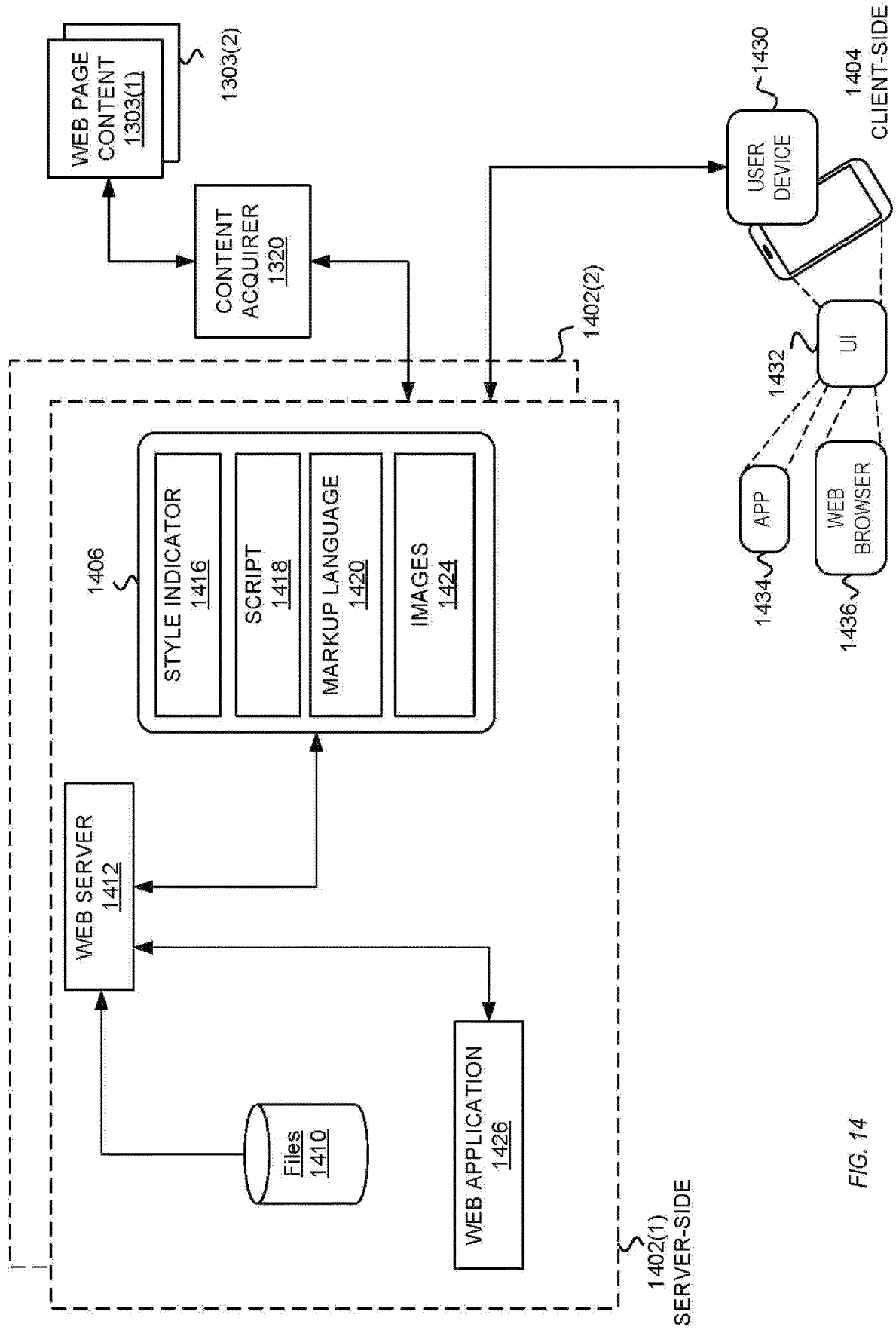
FIG. 14 is a diagram illustrating example use of the detection engine of FIG. 13 to access web page content for analysis.

FIG. 13 is a system diagram illustrating embodiments of another detection engine of the investigation subsystem for analyzing content associated with suspect URLs. The operation of the detection engine 302(3) (referred to as a content phishing detection engine) is discussed in conjunction with FIG. 14. FIG. 14 is a diagram illustrating example use of the detection engine of FIG. 13 to access web page content for analysis. The content phishing detection engine 302(3) can create a model for content at a suspect URL and compare that another model of an exemplary webpage (e.g., an exemplary webpage for the business entity that accesses the content phishing detection engine 302(3)).

In phishing cases, a bad actor may copy some elements of the legitimate web page. As discussed above, such a phishing web page may have a suspect URL and/or a suspect certificate associated with it. However, the MAPDAM platform 102 may not be able to determine phishing intent of the phishing web page based on the other detection functions (or perhaps the detection plan for a particular suspect URL has the content phishing detection engine 302(3) performing a first detection function prior to the detection functions of detection engines 302(1) and/or 302(2). Thus in some cases, none of the previous detection engines in the detection plan can determine with certainty whether a suspect URL associated with a phishing web page (e.g., such as the web page 1406) indicates phishing, or whether a certificate associated with such as a suspect URL is associated with such a phishing web page. The detection engine 302(3) can then perform detection functions of determining phishing based on analysis of suspect web page content 1303.

A phishing web page can include some a mechanism to prompt for and receive data from an unsuspecting user for the purpose of stealing credentials and/or other information. In order for phishing web pages to look like and mimic a legitimate web page, certain elements of a phishing web page can match very closely to that of a corresponding legitimate web page. A phishing web page can include dependencies with a unique fingerprint from legitimate web pages. Thus, a phishing page would have many of the elements of the web page 1406 that have similar content, characteristics, structure, and/or values as a legitimate web page.

As shown, the detection engine 302(3) can implement phishing detection based on modeling of web page content associated with suspect URLs. The content phishing detection engine 302(3) includes a model creator 1304, one or more scoring functions 1306(1), 1306(2), . . . 1306(N) (referred to collectively as 1306), a machine learning model 1308, a data store 13010, and a scoring engine 1312. The model creator 1304 can interface with a content acquirer 1320 to obtain web page content 1303 for one or more web pages, as discussed with reference to FIG. 14. Depending on the configuration of detection functions in a detection plan for data being analyzed, the actual web page content for the URL being analyzed may not be accessed until the content phishing detection engine 302(3) performs its detection function.

The model creator 1304 can access the web page content 1303 for a suspect URL, and generate models based on the web page content 1303. With reference to FIG. 14, the content acquirer can determine the web page content 1303 for various types of static and/or dynamic web pages. As shown in FIG. 14, in some embodiments a server-side system 1402 can be used to generate web pages such as a web page 1406. The web page 1406 can then be accessed via a client-side application, such as a web browser 1436 (or an application 1434) that executes on a user device 1430. The web browser can render the web page 1406 in a user interface (UI) 1432.

FIG. 14 illustrates a simplification of a web page generation process. The web server 1412 can generate the web page 1406 using one or more of files 1401. The web page 1406 can include a style indicator 1416, a script portion 1418, a markup language portion 1420, and/or images 1424. The web page 1406 can have one or more dynamic elements that are supplied via a web application 1426. In some implementations, the web page 1406 can have embedded elements such as iframes that can point to another source (e.g., another webpage). The web page generation process of FIG. 14 illustrates generation of some exemplary web pages, e.g., legitimate web pages of the business entity that accesses the content phishing detection engine 302(3).

The markup language portion 1420 can be implemented via any markup language for structuring web pages. The markup language portion 1420 can include actual textual content as well as some instructions on how to organize and format the textual content. The markup language can be implemented as Hypertext Markup Language (HTML), eXtensible markup language (XML), among others.

The script portion 1418 can include scripts of an interpreted language that can be interpreted on a client-side application, such as the web browser 1436. The script 1418 can enable the web browser 1436 to present interactive web pages at the UI 1432. The script portion 1418 can be implemented using JAVASCRIPT, NODE.JS, DART, and/or GO, among others. The images portion 1424 can be implemented using various types of image objects that are referenced by the script 1418 and/or the markup language portion. The images portion 1424 can include images that are rendered on the UI 1432 by the web browser 1436.

The style indicator 1416 can thus indicate how the web browser 1436 presents content (i.e., the markup language 1420, images 1424, and/or any dynamic elements) of the web page 1406. The style indicator 1416 can be a cascading style sheet (CSS) data that describe how to present a web page. Thus, the style indicator 1416 can indicate to the web browser 1426 how the web page 1406 should be presented at the UI 1432 of the web browser 1436. The style indicator 1416 can be alternatively implemented as Leaner Style Sheets (LESS), Syntactically Awesome Style Sheets (SASS), among others.

The model creator 1304 can generate a model for each web page. The model creator can thus generate a model for a suspect web page and an exemplary model for an exemplary web page, i.e., a legitimate web page. With reference to FIG. 14, the model creator 1304 can access a web page 1406 to generate the web page content 1303. The model creator 1304 can access exemplary (e.g., legitimate) web pages for creation of exemplary model(s). In some embodiments, the exemplary model and/or exemplary (e.g., legitimate) configuration can be provided to the detection engine 302(3) by the associated detection plan, without a need for the model creator to access exemplary web pages.

The model creator 1302 can create a model 1304(1) based on web page content 1303(1) by dynamically accessing the target website URL, markup language portion, style indicator, scripts, and/or images. The model creator 1302 can build a document object model (DOM) frame based on the markup language portion that can indicate a logical frame of the accessed web page. The model creator 1304 can access one or more exemplary web pages for the business that uses the MAPDAM platform 102.

For the textual content of the markup language portion, the model creator 1302 can generate text tokens (e.g., for similarity comparisons), and can extract link strings for any links used in the web page. The model creator 1302 can extract favicon text from the textual content, where a favicon indicates an icon associated with the web page. The model creator 1302 can build a regular expression (regex) pattern for the business entity name and/or other indicators, where the regex is a string that describes a specific text pattern that can be used to find similar text patterns (e.g., such as use of wildcards). This model can then be edited to add additional strings unique to an organization. Each model can be structured as a configuration file, such as a JSON configuration file.

The scoring functions 1306 can include various functions that are run against the suspect model (e.g., the model 1304(1) that is built for the suspect web page) using various portions of the exemplary model (e.g., the model 1304(2) that is built for the exemplary web page). Thus, a first scoring function 1306(1) can be ran on a first portion of the suspect model 1304(1), such as to determine whether the markup language portion 1420 includes suspicious elements. Other scoring functions can be similarly run on various portions of the model, with some of the scoring functions comparing certain elements of the suspect model 1304(1) against corresponding elements of the exemplary model 1304(2), with a greater similarity typically indicating a higher phishing likelihood. The scoring engine 1312 can aggregate scores from the scoring functions 1306 and determine whether the resultant score is greater than a certain phishing threshold. The scoring engine can also determine the resultant score based on results from the content analyzer and/or the machine learning model 1308, if one or both of these latter tests are run against the suspect model 1306(1).

The machine learning model 1308 can use learned features that are not based on predetermined scoring functions, but can be learned from many types of phishing webpages and/or portions of phishing webpages. For example, when detecting potential phishing webpages which would be targeting potential customers of PAYPAL and/or users in the payment space, the machine learning model 1308 can be trained on known phishing web pages in the phishing space. In this example, the machine learning model 1308 could determine similarity between learned examples for phishing payment input prompts and a payment input prompt of the suspect model. Thus, in some embodiments, the machine learning model can be customized for each type of business that is using the MAPDAM platform 102. The result from the machine learning model 1308 can be amended into the resultant score.

In some embodiments, the machine learning model 1308 can implement an Isolation Forest algorithm. Features for classification of the Isolation Forest algorithm can be based on the Halstead complexities of the webpage code (e.g., the script 1418 of the suspect webpage), of the content text (e.g., of the markup language 1420 of the suspect webpage), and/or of the overall HTML complexity (e.g., of the markup language 1420 and/or of the style indicator 1416 of the suspect webpage). A difficulty measure (of the Halstead complexity) can be related to the difficulty of the corresponding portion of the suspect webpage to write and/or understand, e.g., such when doing code review. The effort measure (of the Halstead complexity) can translate into actual coding time using these relations. In other embodiments, features for classification of the Isolation Forest algorithm can be based on other metrics of the webpage code, of the content text, and/or of the overall HTML complexity, such based on cyclomatic complexity, CISQ automated quality characteristic measures, among others.

In some embodiments, the machine learning model can be implemented using a Deep Neural Network (DNN) model. The DNN model can use various features during model creation, such as measures of complexity, language, markup, obfuscation, and overall style of webpages. The DNN model can be trained using confirmed phishing webpage examples. Once trained, the DNN model can be used to predict the likelihood of a suspect webpage being a phishing page.

In some embodiments, the model creator 1302 can also create the text tokens for the suspect web page during model creation. The model creator 1302 examine whether some of the text of the suspect web page includes foreign language characters. For example, some phishing web pages can use characters from a foreign (e.g., non-English characters for English web pages) that appear the same as the English characters but may not register as the same in some text similarity tests. Thus, the text tokens used by the content analyzer 1314 can be normalized to a common language set. Furthermore, indication of such character set deception can be noted by one of the scoring functions 1306 as a likely indicator of deception and thus phishing. In some embodiments, the model creator 1302 can obtain some of the text for analysis from the screenshot analysis engine (e.g., via OCR-ed suspect text).

In some embodiments, the content analyzer 1314 can test for both surface similarity (e.g., lexical similarity—do the different text portions appear the same) as well as meaning similarity (e.g., semantic similarity—do the different text portion have similar meaning). Phishing websites can have both surface similarity in text (the phishing text appears the same as legitimate text) as well as meaning similarity (the phishing text has a similar underlying purpose as the legitimate text), although surface similarity is typically more prevalent by phishing webpages. The content analyzer 1314 can adjust its test between surface and meaning text similarities depending on type of text similarity prevalent for a given business type.

The scoring functions 1306 can include an obfuscation detector that can test the suspect model whether the corresponding markup language portion 1420 includes suspicious elements that can be used by bad actors to obfuscate and confuse many phishing detection systems. The obfuscation detector can look for null bytes in the web page 1406, large percent encoded blocks, and/or large base64 encoded blocks, as legitimate web pages typically do not include null bytes. The obfuscation detector can also determine whether the suspect web page is encrypted, where encrypted web pages are another indicator for phishing. Presence of obfuscation indicates a greater likelihood of phishing.

The scoring functions 1306 can include a redirection detector that can test the suspect model whether the markup language portion 1420 includes redirects. A high number and/or unusual type of page redirects can be indicators of suspicious activity, especially when combined with other feature detection (e.g., detection by other scoring functions). The redirection detector can test for unusual types of redirects where the suspect model indicates redirects (including a script that refreshes the suspect webpage) to be the only (or one or a very few) functional elements on the suspect web page. The redirection detector can check for suspicious meta refreshes or redirects to unrelated web pages.

The scoring functions 1306 can include a web page structure similarity detector that can compare a model structure of the suspect web page to a model structure of the legitimate web page. The model structure can be included by the respective model in a document object model (DOM) structure, and/or using other structure representations. The web page structure similarity detector can examine analogous structure portions of the suspect model, such as for a login portion of the suspect web page and a corresponding login portion of the legitimate web page. The web page structure similarity detector can perform the similarity tests using edit distance calculations between similar elements in different models. The web page structure similarity detector can perform the similarity tests using vertices analysis between similar elements in different models. The web page structure similarity detector can analyze similarity in tag use (e.g., between tags in DOM) between the different models. The web page structure similarity detector can analyze similarity in paths from root tags between the two models. The web page structure similarity detector can look at partial scores of its various structure calculations and determine whether they indicate web page structure similarity that is greater than a certain phishing threshold.

The scoring functions 1306 can include a style portion similarity detector that can compare a style structure of the suspect web page to a style structure of the legitimate web page. The style portion similarity detector can determine phishing pages that appear legitimate by replicating parts of exemplary web pages. For example, a phishing webpages can mimic a general design that appears familiar, such as a general design structure including identifiable characteristics such as fonts, colors, arrangement of visual elements of the exemplary web pages. The style structure can be included by the respective model in CSS structure, and/or using other structure representations.

The style portion similarity detector can examine how various style characteristics of the suspect model match corresponding style characteristics of the legitimate web pages. The matching determination can be performed for certain stylistic elements that can easily confuse and deceive users into thinking that a phishing web page is legitimate. Examples of stylistic elements include certain colors (e.g., PAYPAL's trademark blue color), where the matching can look for colors that are similar in shade; form styles (e.g., buttons, sliders, other visual elements); fonts; general layout, among others. Presence of style portion similarity indicates a greater likelihood of phishing.

The scoring functions 1306 can include a keyword blacklist detector that can compare the text used by the markup language portion to that of typical phishing websites. This analysis is simpler than the one performed by the content analyzer 1314, and simply looks at blacklisted keywords without analyzing meaning. The blacklisted words can vary between business that use the MAPDAM platform 102. The black-listed words can include a name of the business (e.g., PAYPAL), words such as "required credit card information" and others. The scoring functions 1306 can include a markup language portion similarity detector that can simply look for similarity between the textual content of the suspect web page and legitimate web pages. For example, some phishing web pages can simply include textual content that is copied and pasted into a phishing web page. Presence of blacklisted keywords indicates a greater likelihood of phishing.

The scoring functions 1306 can include a configuration file similarity detector. A webpage can use certain configuration files, and some phishing web pages can simply copy and/or reuse entire or portions of configuration files. Presence of copied portions of configuration files indicates a greater likelihood of phishing.

The scoring functions 1306 can include a deceptive link and frame detector that can test the suspect model whether the corresponding markup language portion 1420 includes suspicious links and/or frames that can be used by bad actors to deceive users. The deceptive link and frame detector can look for absence of links (e.g., internal links between different portions of the same web page), which indicates a higher likelihood of phishing. The deceptive link and frame detector can look for presence of links to the entity that is using the MAPDAM platform (e.g., links to PAYPAL), which indicates a higher likelihood of phishing. The deceptive link and frame detector can look for presence of iFrames with a different domain than the URL of the suspect web page.

The content analyzer 1314 can be performed if a resultant score from the scoring functions does not necessarily indicate that the suspect web page is a phishing webpage. The content analyzer 1314 can run comparison tests between text tokens of the suspect web model and text tokens for the type of business/entity that is using the MAPDAM platform 102, such as text tokens associated with businesses in the payment space. The content analyzer 1314 can perform textual similarity functions such as Jaccard similarity, fuzzy hashing, and/or cosine similarities between vectors for text tokens of the suspect web page and known vectors for legitimate web pages. The result from the content analyzer 1314 can be amended into the resultant score.

Figure 15:
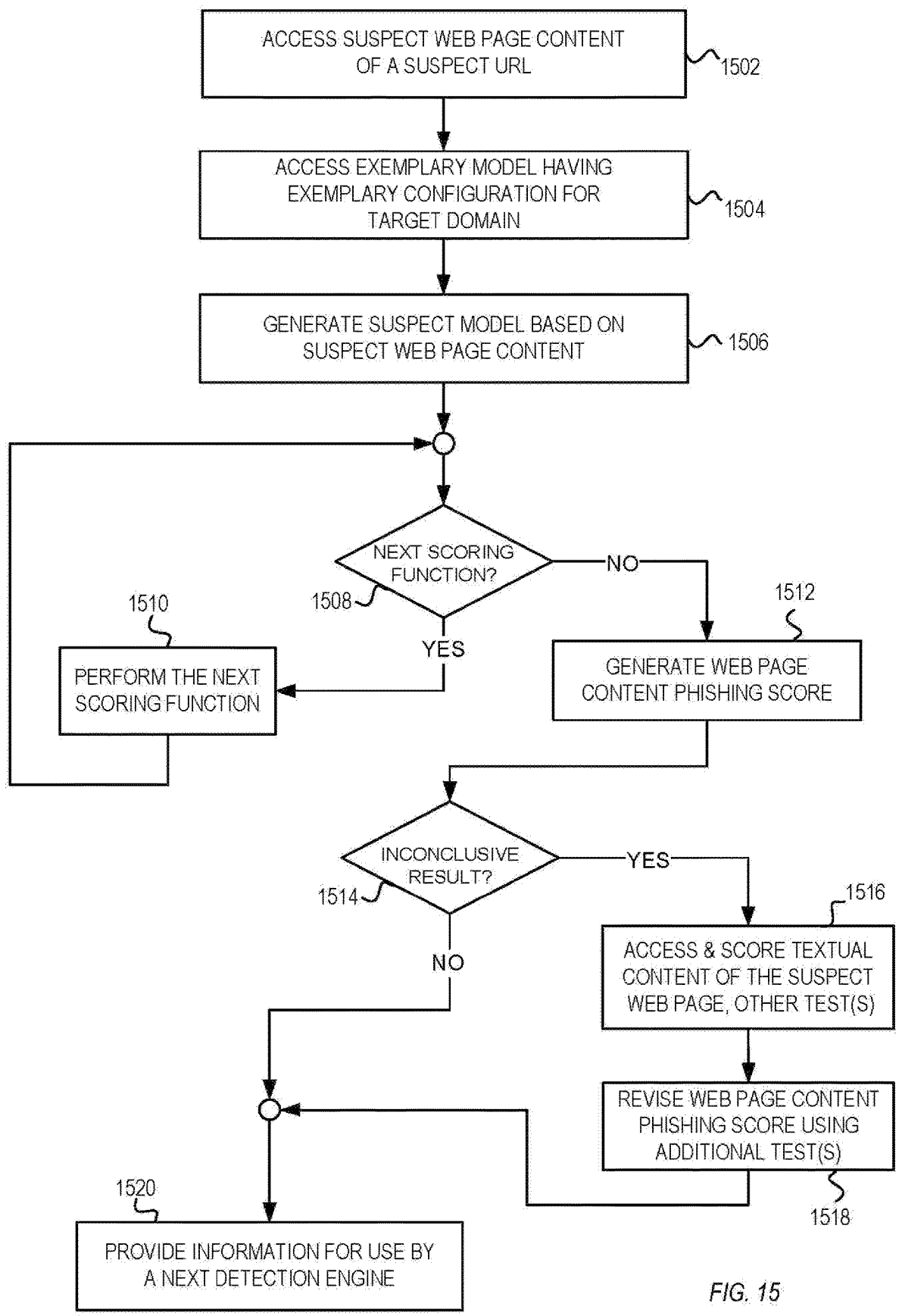
FIG. 15 is a flow chart illustrating embodiments of operations of using the detection engine of FIG. 13 to analyze content associated with certain URLs.

FIG. 15 is a flow chart illustrating embodiments of operations of using the detection engine of FIG. 13 to analyze content associated with certain URLs. The method of FIG. 15 is described with reference to the systems and components described in FIGS. 1-6 and 13-14, for illustration purposes and not as a limitation. The example operations can be carried out by one or more components of the detection engine 302(3) that implements a content phishing detection engine. For example, the operations of FIG. 15 can be carried out and/or initiated by the model creator 1302, scoring functions 1306, content analyzer 1314, machine learning models 1308, and/or the scoring engine 1312.

Beginning with 1502, the detection engine 302(3) can access suspect web page content of a suspect URL. With reference to FIG. 13, the model creator 1302 can access the web page content via the content acquirer 1320.

At 1504, the detection engine 302(3) can access an exemplary model. The model can have an exemplary configuration for a domain that is targeted by the suspect URL. In some implementations, the exemplary model can be generated by the model creator 1302 by accessing the legitimate web page. In some implementations, the exemplary model can be received from the other portions of the MAPDAM platform.

At 1506, the detection engine 302(3) can generate a suspect model based on the suspect web page content. With reference to FIG. 13, the model creator can generate a model 1304(1) based on accessing the suspect web page content 1303 (e.g., of step 1502).

At 1508, the detection engine 302(3) can determine whether to initiate a test by a next scoring function. The detection engine 302(3) (e.g., an orchestrator, not shown) can have a list of scoring functions that are performed on the suspect model. If the detection engine 302(3) determines to initiate a test by a next scoring function, flow continues to 1510; otherwise the flow continues to 1512.

At 1510, the detection engine 302(3) can initiate a test by the next scoring function. Thus, the next one of the scoring functions 1306(1)-1306(M) can be performed. As discussed above some of the scoring functions 1306 only access the suspect model, whereas other scoring functions 1306 can access both certain portions of the suspect model and corresponding portions of the exemplary model.

At 1512, the detection engine 302(3) can determine a web page content phishing score based on results from the scoring functions 1306. At 1514, the detection engine 302(3) can determine whether the web page content phishing score is inconclusive regarding the suspect web page being a phishing web page based on the content analysis. If the detection engine 302(3) determines that the web page content phishing score is inconclusive, flow continues at 1516. Otherwise, the flow continues at 1520.

At 1516, the detection engine 302(3) can initiate one or more additional tests. For example, the detection engine 302(2) can initiate the textual content test by the content analyzer 1314 and/or a learned features analysis by the machine learning model 1308. At 1518, the detection engine 302(3) can revise the web page content phishing score using results from the additional test(s). At 1520, the detection engine 302(3) can provide information for use by a next detection engine. The detection engine 302(30 can provide a result that includes a decision indicating whether the suspect webpage is a phishing web page, a score (e.g., a confidence indication) of the decision, and supporting data such as indications of problematic content portions.

It should be understood that FIGS. 1-15 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 6, 9, 12, and/or 15 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 16:
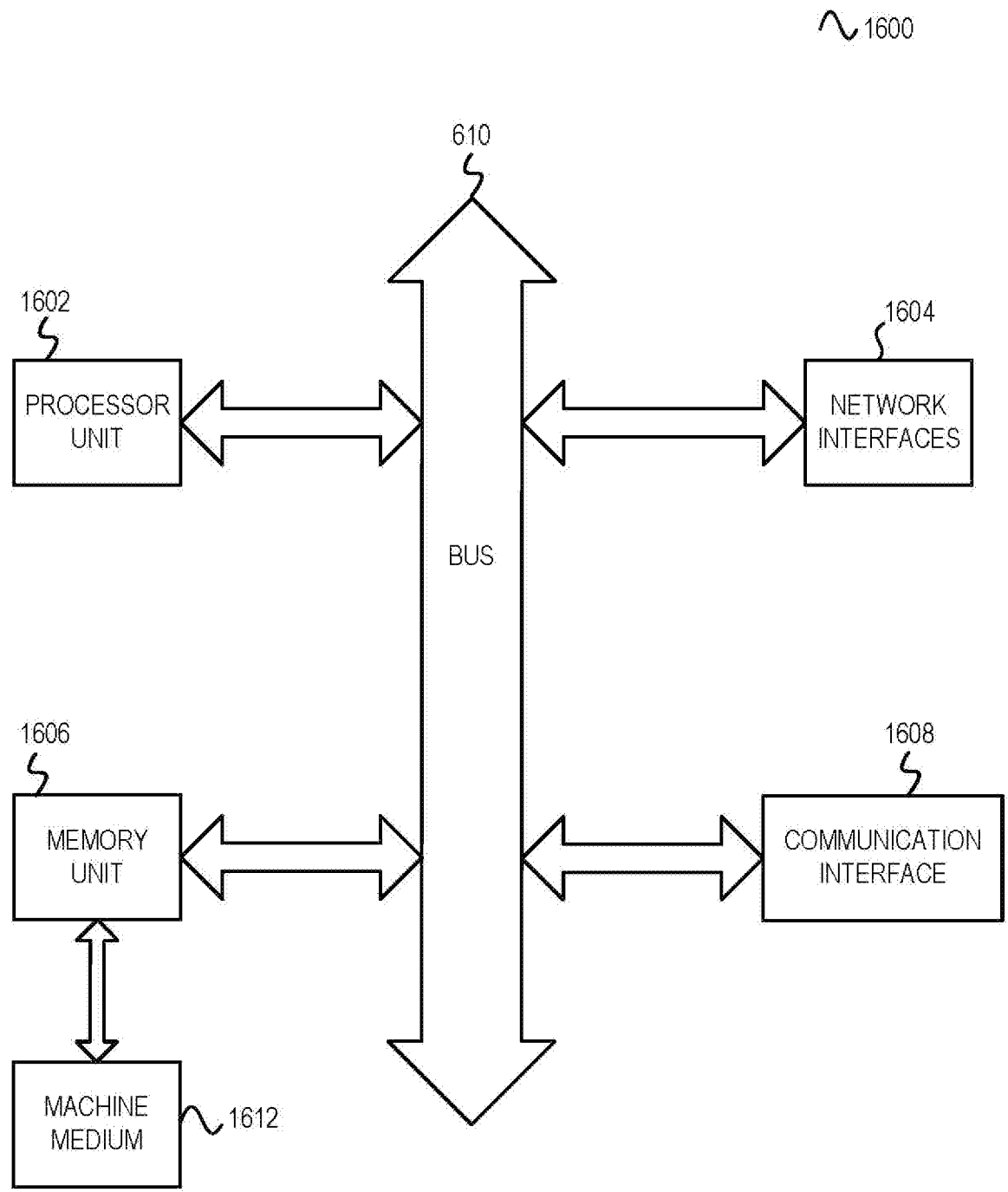
FIG. 16 is a block diagram illustrating embodiments of electronic devices used in the malware and phishing detection and mediation platform of FIGS. 1-15.

FIG. 16 is a block diagram of one embodiment of an electronic device 1600 used in the communication systems of FIGS. 1-15. In some implementations, the electronic device 1600 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 1600 can include a processor unit 1602 (possibly including multiple processors, multiple cores, multiple nodes, and/or implementing multi-threading, etc.). The electronic device 1600 can also include memory unit 1606. The memory unit 1606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1600 can also include a bus 1610 (e.g., PCI, ISA, PCI-Express, HyperTransport®, InfiniBand®, NuBus, AHB, AXI, etc.), and network interfaces 1604 can include wire-based interfaces (e.g., an Ethernet interface, a powerline communication interface, etc.). The electronic device 1600 includes a communication interface 1608 for network communications. The communication interface 1608 can include at least one of a wireless network interface (e.g., a WLAN interface, a Bluetooth interface, a WiMAX interface, a ZigBee interface, a Wireless USB interface, etc.), In some implementations, the electronic device 1600 may support multiple network interfaces—each of which is configured to couple the electronic device 1600 to a different communication network.

The memory unit 1606 can embody functionality to implement embodiments described in FIGS. 1-15 above. In one embodiment, the memory unit 1606 can include one or more of functionalities of the malware and phishing detection and mediation platform. Any one of these functionalities may be partially (or entirely) implemented in hardware and/or on the processor unit 1602. For example, some functionality may be implemented with an application specific integrated circuit, in logic implemented in the processor unit 1602, in a co-processor on a peripheral device or card, etc. Further, realizations may include fewer or additional components not illustrated in FIG. 16 (e.g., video cards, audio cards, additional network interfaces, peripheral devices, etc.). The processor unit 1602, memory unit 1606, the network interfaces 1604, and the communication interface 1608 are coupled to the bus 1610. Although illustrated as being coupled to the bus 1610, the memory unit 1606 may be coupled to the processor unit 1602.

While the embodiments are described with reference to various implementations and exploitations, it will be understood that these embodiments are illustrative and that the scope of the present disclosure is not limited to them. In general, techniques the malware and phishing detection and mediation platform as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for phishing detection based on modeling of web page content, the method comprising:
    accessing suspect web page content of a suspect Uniform Resource Locator (URL);
    splitting the suspect URL into a plurality of features that include one or more of an URL domain, a hostname, a path parameter, or a path query;
    assigning a partial score to each of the features of the plurality of features;
    determining a URL-based rules score at least in part by aggregating the partial score assigned to each of the features of the plurality of features;
    accessing an exemplary model based on an exemplary configuration for an indicated domain associated with the suspect URL, wherein the exemplary model indicates structure and characteristics of an example web page of the indicated domain;

accessing a suspect web page model based on the suspect web page content, wherein the suspect web page model indicates structure and characteristics of the suspect web page content;

performing a plurality of scoring functions for potential phishing web page content based on the suspect web page model, each of the plurality of scoring functions providing a respective result that includes a respective phishing score, wherein at least one of the plurality of scoring functions uses the exemplary model to perform an analysis to generate one of the respective results; and generating a web page content phishing score based, at least in part, on the URL-based rules score and at least one of the phishing scores generated from the plurality of scoring functions.

2. The method of claim 1, wherein said performing a plurality of scoring functions comprises:

determining a similarity score between the suspect web page content and original content based on an original domain indicated by the suspect URL, wherein the similarity score indicates a degree of similarity between a suspect structure of web page objects of the suspect web page content and an original structure of web page objects of an example web page of the original domain, wherein the suspect structure and the original structure are each in a Document Object Model (DOM) format.

3. The method of claim 1, wherein said performing a plurality of scoring functions comprises:

determining a deception score between the suspect web page content and original content based on an original domain indicated by the suspect URL, wherein the deception score indicates a degree of similarity between characteristics of web page objects of the suspect web page content and characteristics of web page objects of an example web page of the original domain.

4. The method of claim 3, wherein said determining the deception score comprises determining a degree of similarity between characteristics of at least one cascading style sheet (CSS) associated with the suspect web page content and characteristics of at least one CSS associated with the example web page of the original domain.

5. The method of claim 1, wherein said accessing the exemplary model comprises accessing an exemplary configuration from a plurality of exemplary configurations based on the indicated domain, and wherein the plurality of scoring functions is performed based on a predefined portion of the potential phishing web page content, and wherein the accessing the exemplary model comprises accessing the predefined portion of the example web page.

6. The method of claim 1, wherein said accessing the suspect web page model comprises:

accessing web page objects, and their respective characteristics, of the suspect web page content to create a suspect structure model; and accessing at least one style sheet associated with the suspect web page content to create a suspect style sheet model;

wherein the at least one of the plurality of scoring functions uses at least one of the suspect structure model or the suspect style sheet model to perform said analysis.

7. The method of claim 1, wherein said accessing the suspect web page model comprises accessing a suspect structure of one or more scripts of the suspect web page content to create a suspect script model, wherein the one or more scripts are different from a hypertext markup language (HTML); and wherein the at least one of the plurality of scoring functions uses the suspect script model to perform said analysis.

8. The method of claim 1, wherein said accessing the suspect web page model comprises accessing suspect frames of one or more scripts of one or more suspect web page objects to create a suspect frame model, wherein the suspect frame model comprises one or more links that point to an entity that uses a malware and phishing detection and mediation (MAPDAM) platform; and wherein the at least one of the plurality of scoring functions uses the suspect frame model to determine whether the suspect frame model links to an original domain indicated by the suspect URL.

9. The method of claim 1, wherein said generating the web page content phishing score is further based on a machine learning model determining a degree of similarity between known phishing features and features of the suspect web page model, wherein the machine learning model is trained based on URLs of web pages that have been determined to be phishing web pages.

10. The method of claim 1, further comprising:

determining that the web page content phishing score indicates an undetermined result;

accessing suspect textual content of the suspect web page content;

scoring the suspect textual content based on textual language metadata of an example web page of the original domain; and revising the web page content phishing score using based on the scoring of the suspect textual content.

11. A system, comprising:

a non-transitory memory storing instructions; and one or more hardware processors configured to execute the instructions to cause the system to perform operations comprising:

accessing suspect web page content of a suspect Uniform Resource Locator (URL), wherein the accessing comprises extracting one or more link strings or extracting favicon text from the suspect web page content;

generating a plurality of features based on the suspect URL;

assigning a plurality of partial scores to the plurality of features, respectively;

calculating an aggregate score based on the plurality of partial scores;

accessing an exemplary model indicating an exemplary configuration of a targeted domain, wherein the exemplary model indicates structure and characteristics of an example web page of the targeted domain;

accessing a suspect web page model based on the suspect web page content, wherein the suspect web page model indicates structure and characteristics of the suspect web page content;

performing a plurality of scoring functions that compare the suspect web page model and the exemplary model, each of the plurality of scoring functions providing a respective result, wherein the plurality of scoring functions are performed using one or more detectors configured to detect whether a markup language, a structure, or a content of the suspect web page model exhibits characteristics of known phishing web sites; and calculating a web page content phishing score based, at least in part, on the aggregate score and at least one of the phishing scores generated from the plurality of scoring functions.

12. The system of claim 11, wherein said performing a plurality of scoring functions comprises:

determining a similarity score between the suspect web page content and original content based on an original domain indicated by the suspect URL, wherein the similarity score indicates a degree of similarity between a suspect structure of web page objects of the suspect web page content and an original structure of web page objects of an example web page of the original domain.

13. The system of claim 11, wherein said performing a plurality of scoring functions comprises:

determining a deception score between the suspect web page content and original content based on an original domain indicated by the suspect URL, wherein the deception score indicates a degree of similarity between characteristics of web page objects of the suspect web page content and characteristics of web page objects of an example web page of the original domain.

14. The system of claim 13, wherein said determining the deception score comprises determining a degree of similarity between characteristics of at least one style sheet associated with the suspect web page content and characteristics of at least one style sheet associated with the example web page of the original domain.

15. The system of claim 11, wherein the operations further comprise:

creating a suspect structure model based on web page objects, and their respective characteristics, of the suspect web page content;

creating a suspect style sheet model based on at least one style sheet associated with the suspect web page content;

performing an analysis using at least one of the suspect structure model or the suspect style sheet model; and generating, based on the analysis, the respective results.

16. A non-transitory machine-readable medium having instructions stored thereon, the instructions executable to cause a machine to perform operations comprising:

accessing suspect web page content of a suspect Uniform Resource Locator (URL);

extracting a plurality of features from the suspect URL;

assigning one or more sub-scores to at least some of the features of the plurality of features;

determining an aggregate suspect URL score based on the one or more sub-scores;

accessing an exemplary model indicating an exemplary configuration of a targeted domain, wherein the exemplary model indicates structure and characteristics of an example web page of the targeted domain;

accessing a suspect web page model based on the suspect web page content, wherein the suspect web page model indicates structure and characteristics of the suspect web page content;

performing a plurality of scoring functions that compare the suspect web page model and the exemplary model, each of the plurality of scoring functions providing a respective result;

determining whether the suspect web page content contains one or more foreign language characters that appear as one or more English characters; and calculating a web page content phishing score based, at least in part, on the aggregate suspect URL score and on at least one of the phishing scores generated from the plurality of scoring functions and further based on the determining.

17. The non-transitory machine-readable medium of claim 16, wherein said performing a plurality of scoring functions comprises:

determining a similarity score between the suspect web page content and original content based on an original domain indicated by the suspect URL, wherein the similarity score indicates a degree of similarity between a suspect structure of web page objects of the suspect web page content and an original structure of web page objects of an example web page of the original domain.

18. The non-transitory machine-readable medium of claim 16, wherein said performing a plurality of scoring functions comprises:

determining a deception score between the suspect web page content and original content based on an original domain indicated by the suspect URL, wherein the deception score indicates a degree of similarity between characteristics of web page objects of the suspect web page content and characteristics of web page objects of an example web page of the original domain.

19. The non-transitory machine-readable medium of claim 18, wherein said determining the deception score comprises determining a degree of similarity between characteristics of at least one style sheet associated with the suspect web page content and characteristics of at least one style sheet associated with the example web page of the original domain.

20. The non-transitory machine-readable medium of claim 16, wherein the operations further comprise:

creating a suspect structure model based on web page objects, and their respective characteristics, of the suspect web page content;

creating a suspect style sheet model based on at least one style sheet associated with the suspect web page content;

performing an analysis using at least one of the suspect structure model or the suspect style sheet model; and generating, based on the analysis, the respective results.

* * * * *